(12) United States Patent
Verheyden

(10) Patent No.: US 12,248,182 B2
(45) Date of Patent: Mar. 11, 2025

(54) FIBER OPTIC CONNECTOR WITH SHUTTER

(71) Applicant: COMMSCOPE TECHNOLOGIES LLC, Hickory, NC (US)

(72) Inventor: Danny Willy August Verheyden, Gelrode (BE)

(73) Assignee: CommScope Technologies LLC, Hickory, NC (US)

( * ) Notice: Subject to any disclaimer, the term of this patent is extended or adjusted under 35 U.S.C. 154(b) by 405 days.

(21) Appl. No.: 17/799,168

(22) PCT Filed: Feb. 9, 2021

(86) PCT No.: PCT/US2021/017267
§ 371 (c)(1),
(2) Date: Aug. 11, 2022

(87) PCT Pub. No.: WO2021/163063
PCT Pub. Date: Aug. 19, 2021

(65) Prior Publication Data
US 2023/0089214 A1    Mar. 23, 2023

Related U.S. Application Data

(60) Provisional application No. 63/037,306, filed on Jun. 10, 2020, provisional application No. 63/037,317, filed on Jun. 10, 2020, provisional application No. 62/972,776, filed on Feb. 11, 2020.

(51) Int. Cl.
*G02B 6/38* (2006.01)
(52) U.S. Cl.
CPC ......... *G02B 6/3825* (2013.01); *G02B 6/3847* (2013.01)

(58) Field of Classification Search
CPC ............................ G02B 6/3825; G02B 6/3847
USPC .......................................................... 385/53
See application file for complete search history.

(56) References Cited

U.S. PATENT DOCUMENTS

| 4,277,135 A | 7/1981 | Schrott et al. |
| 4,673,242 A | 6/1987 | Logan et al. |
| 6,491,442 B1 * | 12/2002 | Murakami ............. G02B 6/389 385/59 |
| 8,226,302 B2 | 7/2012 | Kobayashi et al. |
| 8,870,466 B2 | 10/2014 | Lu |

(Continued)

FOREIGN PATENT DOCUMENTS

| WO | 2005/111685 A1 | 11/2005 |
| WO | 2012/112344 A1 | 8/2012 |

(Continued)

OTHER PUBLICATIONS

International Search Report and Written Opinion of the International Searching Authority for International Patent Application No. PCT/US2021/017267 mailed May 25, 2021, 8 pages.

(Continued)

*Primary Examiner* — Jerry M Blevins
(74) *Attorney, Agent, or Firm* — Merchant & Gould P.C.

(57) ABSTRACT

The present disclosure relates to fiber optic connectors having integrated features for protecting the optical fibers of the fiber optic connectors. The fiber optic connectors can include protective features such as retractable noses and shutters. The fiber optic connectors can include fiber anchoring units with tapered front sections for preventing microbends.

29 Claims, 18 Drawing Sheets

(56) References Cited

U.S. PATENT DOCUMENTS

| | | |
|---|---|---|
| 9,575,272 B2 | 2/2017 | Ott |
| 2013/0308908 A1 | 11/2013 | Isenhour et al. |
| 2022/0163730 A1* | 5/2022 | Verheyden ........... G02B 6/3809 |

FOREIGN PATENT DOCUMENTS

| | | |
|---|---|---|
| WO | 2013/117589 A2 | 8/2013 |
| WO | 2014/118225 A1 | 8/2014 |
| WO | 2016/043922 A1 | 3/2016 |
| WO | 2016/100384 A1 | 6/2016 |
| WO | 2017/070220 A1 | 4/2017 |
| WO | 2017/081306 A1 | 5/2017 |
| WO | 2018/020022 A1 | 2/2018 |
| WO | 2019/077472 A1 | 4/2019 |
| WO | 2020/046709 A1 | 3/2020 |
| WO | 2020/210374 A1 | 10/2020 |

OTHER PUBLICATIONS

Extended European Search Report for Application No. 21754626.6 mailed Feb. 5, 2024.

* cited by examiner

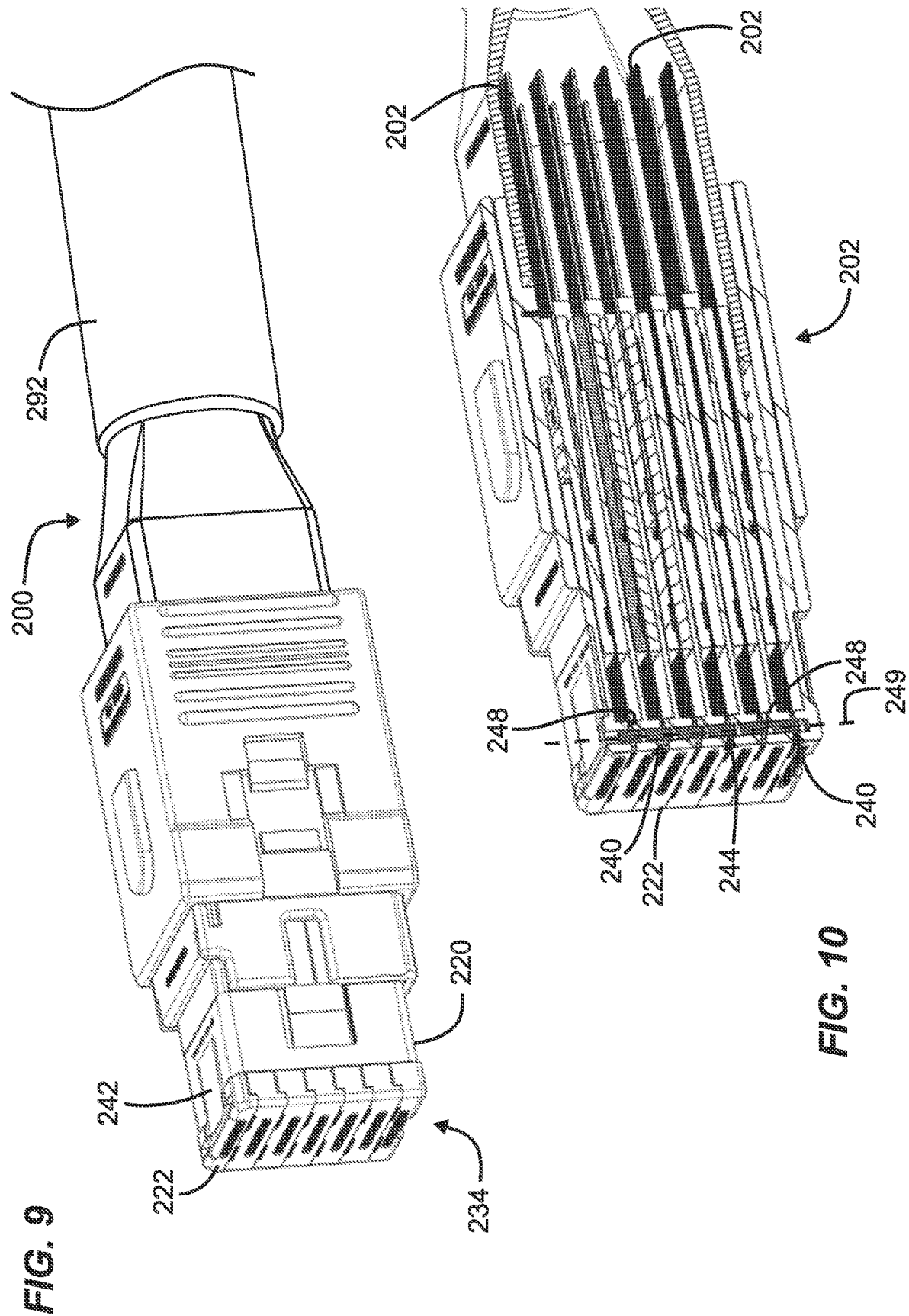

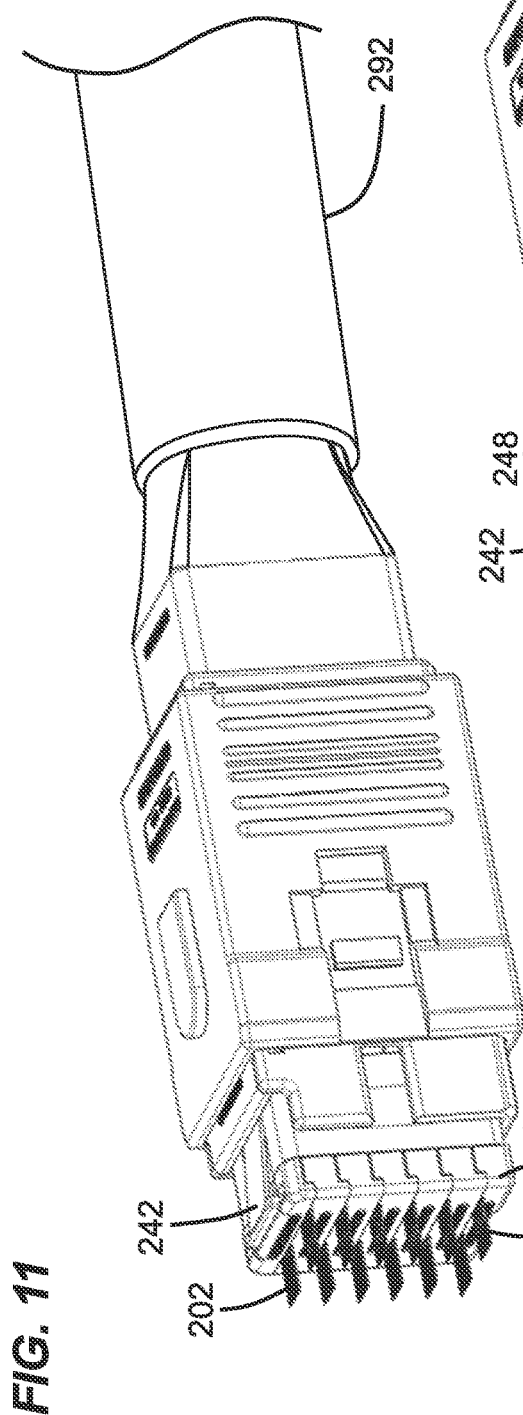
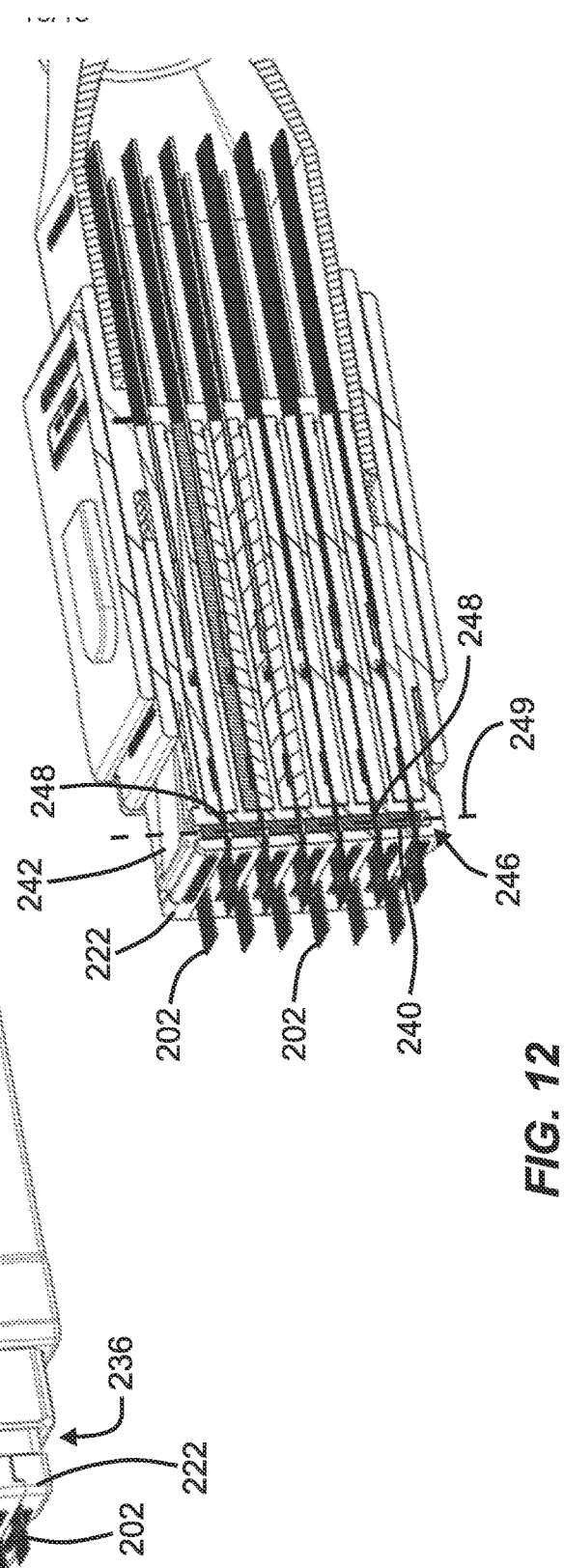
FIG. 11
FIG. 12

FIBER OPTIC CONNECTOR WITH SHUTTER

CROSS-REFERENCE TO RELATED APPLICATIONS

This application is a National Stage Application of PCT/US2021/017267, filed on Feb. 9, 2021, which claims the benefit of U.S. Patent Application Ser. No. 62/972,776, filed on Feb. 11, 2020, and claims the benefit of U.S. Patent Application Ser. No. 63/037,306, filed on Jun. 10, 2020, and claims the benefit of U.S. Patent Application Ser. No. 63/037,317, filed on Jun. 10, 2020, the disclosures of which are incorporated herein by reference in their entireties. To the extent appropriate, a claim of priority is made to each of the above disclosed applications.

TECHNICAL FIELD

The present disclosure relates generally to fiber optic connection components such as fiber optic connectors and adapters. More particularly, the present disclosure relates to ferrule-less fiber optic connection components, systems and methods.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles (LC, SC, MPO), alignment between two fiber optic connectors is provided through the use of an intermediate fiber optic adapter.

Another type of fiber optic connector can be referred to as a ferrule-less fiber optic connector. In a ferrule-less fiber optic connector, an end portion of an optical fiber corresponding to the ferrule-less fiber optic connector is not supported by a ferrule. Instead, the end portion of the optical fiber is a free end portion. Similar to the ferruled connectors described above, fiber optic adapters can be used to assist in optically coupling together two ferrule-less fiber optic connectors. Example ferrule-less fiber optic connectors and/or fiber optic adapters are disclosed by PCT Publication Nos. WO 2012/112344; WO 2013/117598; WO 2017/081306; WO 2016/100384; WO 2016/043922; and U.S. Pat. Nos. 8,870,466 and 9,575,272.

Fiber optical adapters are used to optically couple together optical fiber tips of optical connectors. To accommodate ferrule-less fiber optic connectors, fiber optical adapters can include specialized fiber alignment devices to receive bare optical fibers and align the fiber tips of the connectors received therein to enable the transfer of optical signals there between. Optical connectors can be secured to the optical adapters when received at the ports of the optical adapters. Ferrule-less optical connectors can include integrated features for protecting the optical fibers when the fiber optic connectors are not installed within fiber optic adapters. Example ferrule-less fiber optic connectors having integrated optical fiber protecting features are disclosed by PCT International Publication Numbers WO 2016/100384; WO 2017/070220; and WO 2017/081306.

SUMMARY

Aspects of the present disclosure relate to fiber optic connectors, fiber optic adapters and fiber optic connection systems.

One aspect of the present disclosure relates to a connector plug body having a front end, and a nose-piece mounted at the front end of the connector plug body. The nose-piece includes a plurality of fiber openings defined by a front section of the nose-piece. The fiber openings extend through the front section of the nose-piece in a front-to-back orientation. The nose-piece is moveable relative to the connector plug body along the front-to-back orientation between a forward position and a rearward position. The nose-piece defines a receptacle behind the front section including connector shutter guide surfaces. Additionally, a nose-piece spring biases the nose-piece toward the forward position. A connector shutter mounts in the receptacle of the nose-piece behind the front section of the nose-piece. The connector shutter is linearly moveable relative the nose-piece between a first position in which the connector shutter blocks the fiber openings of the nose-piece and a second position in which the fiber openings of the nose-piece are not blocked. The connector shutter is guided between the first and second positions by the connector shutter guide surfaces of the nose-piece. A connector shutter spring biases the connector shutter toward the first position.

In certain examples, the fiber optic connector includes a plurality of optical fibers that extend through the connector plug body. The plurality of optical fibers have forward free end portions that are co-axially aligned with the fiber openings of the front section of the nose-piece. When the nose-piece is in the forward position and the connector shutter is in the first position, the forward free end portions of the optical fibers are protected behind the connector shutter. When the nose-piece is in the rearward position and the connector shutter is in the second position, the optical fibers extend forwardly past the connector shutter, through the fiber openings of the front section of the nose-piece and forwardly beyond the front section of the nose-piece.

In another aspect the present disclosure relates to a fiber optic connector including: a connector plug body which has a front end and an opposite back end. The fiber optic connector also includes a plurality of optical fibers that extend through the connector plug body in a front-to-back orientation, the plurality of optical fibers have forward free end portions accessible at the front end of the connector plug body. The fiber optic connector also includes a fiber anchoring unit which the optical fibers are secured to. The fiber anchoring unit is positioned within the connector plug body. The fiber anchoring unit provides pitch conversion of the optical fibers from a first pitch in which the optical fibers have a first center-to-center spacing to a second pitch in which the optical fibers have a second center-to-center spacing that is different from the first center-to-center spacing.

In another aspect the present disclosure relates to a fiber optic connector. The fiber optic connector includes a connector plug body which has a front end. The fiber optic connector also includes a nose-piece mounted at the front end of the connector plug body. The nose-piece defines a plurality of nose-piece fiber openings. The nose-piece fiber openings extend through the nose-piece in a front-to-back orientation. The nose-piece is moveable relative to the connector plug body along the front-to-back orientation between a forward position and a rearward position. The nose-piece defines a receptacle including connector shutter guide surfaces. The nose-piece fiber openings include front portions positioned in front of the receptacle and rear portions positioned behind the receptacle. The nose-piece also includes a nose-piece spring for biasing the nose-piece toward the forward position. The fiber optic connector includes a connector shutter that mounts in the receptacle of the nose-piece, the connector shutter is linearly moveable relative the nose-piece between a first position in which the connector shutter blocks the nose-piece fiber openings and a second position in which the nose-piece fiber openings are not blocked. The connector shutter is guided between the first and second positions by the connector shutter guide surfaces of the nose-piece. The fiber optic connector also includes a connector shutter spring that biases the connector shutter toward the first position. The fiber optic connector also includes a plurality of optical fibers that extend through the connector plug body. The plurality of optical fibers have forward free end portions that are co-axially aligned with the nose-piece fiber openings. When the nose-piece is in the forward position and the connector shutter is in the first position the forward free end portions of the optical fibers are positioned in the rear portions of the nose-piece fiber openings and are protected behind the connector shutter, and when the nose-piece is in the rearward position and the connector shutter is in the second position, the optical fibers extend forward past the connector shutter, through the front portions of the nose-piece fiber openings fiber openings with the forward free end portions projecting forwardly beyond a front end of the nose-piece. The fiber optic connector also includes a fiber anchoring unit which the optical fibers are anchored to. The fiber anchoring unit is mounted within the connector plug body. The fiber anchoring unit including anchor fiber openings which the optical fibers are secured in. The anchor fiber openings extend through the fiber anchoring unit along the front-to-back orientation and are co-axially aligned with the nose-piece fiber openings and are positioned rearward with respect to the nose-piece fiber openings. The anchor fiber openings have tapered front sections adjacent the rear portions of the nose-piece fiber openings that expand as the tapered front sections extend forwardly toward the rear portions of the nose-piece fiber openings. The rear portions of the nose-piece fiber openings having tapered rear sections which are adjacent the tapered front sections of the anchor fiber openings. The tapered rear sections of the rear portions of the nose-piece fiber openings expand as the tapered rear sections extend rearward toward the tapered front sections of the anchor fiber openings.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 9 is a perspective view showing another fiber optic connector in accordance with the principles of the present disclosure having a nose-piece in a forward position;

FIG. 10 is a cross-sectional view of the fiber optic connector of FIG. 9;

FIG. 11 is a perspective view showing the fiber optic connector of FIG. 9 with the nose-piece in a rearward position;

FIG. 12 is a cross-sectional view of the fiber optic connector of FIG. 9 with the nose-piece in a rearward position;

DETAILED DESCRIPTION

Figure 7:
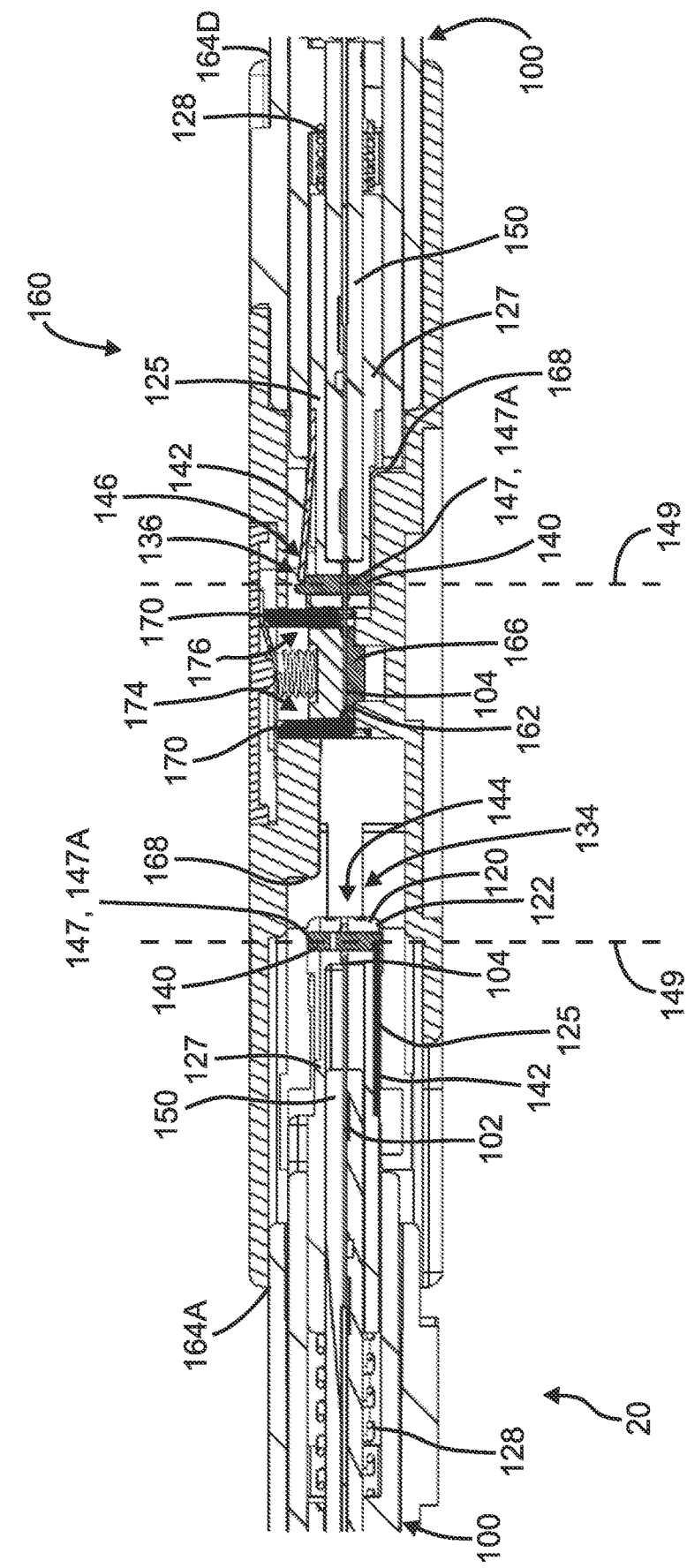
FIG. 7 is a cross-sectional view showing a fiber optic adapter with fiber optic connectors of the type shown at FIG. 1 inserted in ports of the adapter, one of the connectors is fully inserted in the adapter.
Figure 8:
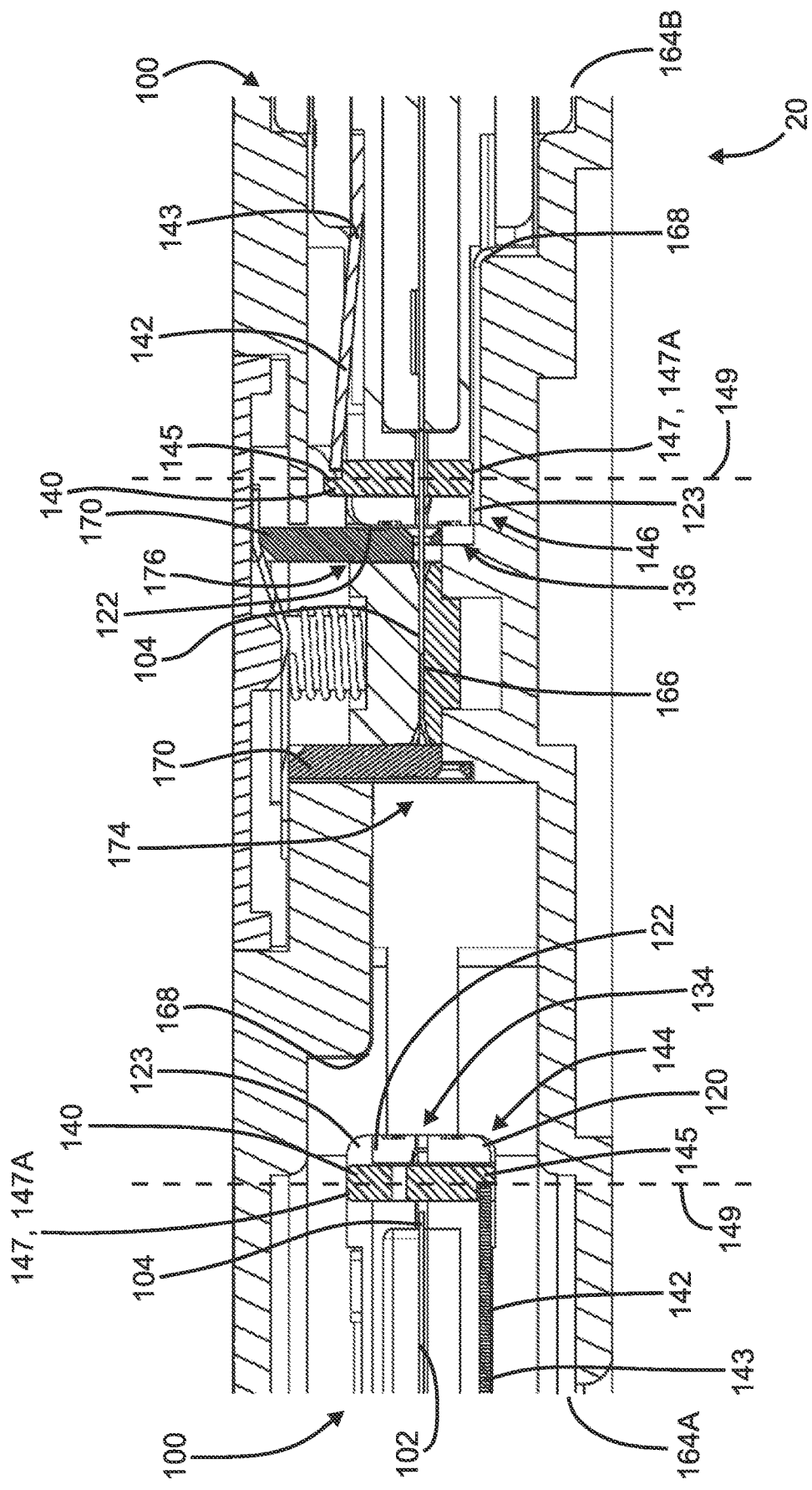
FIG. 8 is an enlarged view of a portion of FIG. 7.

Aspects of the present disclosure relate to a system 20 (see FIGS. 7-8) for providing de-mateable optical couplings between optical fibers 102. As depicted at FIGS. 7 and 8, the system 20 includes a fiber optic adapter 160 in accordance with the principles of the disclosure. The fiber optic adapter 160 includes a first port 164A and second port 164B configured to receive first and second fiber optic connectors 100. The first and second fiber optic connectors 100 are preferably ferrule-less connectors and include a plurality of bare optical fibers 102 (e.g., fibers that each include a core surrounded by a cladding layer that do not include a coating layer surrounding the cladding layer).

In order to align and optically couple together the optical fibers 102 of the fiber optic connectors 100 inserted in the adapter ports 164A, 164B, the fiber optic adapter 160 can include a fiber alignment structure 162 for aligning the bare optical fibers 102 of fiber optic connectors 100. For example, the fiber alignment structure 162 can include fiber-receiving grooves 166 which receive the optical fibers 102. The optical fibers 102 typically correspond to fiber optic cables with the fiber optic connectors 100 mounted at the ends of the fiber optic cables.

FIGS. 1-6 depict one of the fiber optic connectors 100 in more detail. The fiber optic connector 100 includes a connector plug body 110 which has a front end 112 and an opposite back end 113. The fiber optic connector 100 also includes a nose-piece 120 which is mounted at the front end 112 of the connector plug body 110. The nose-piece 120 defines a plurality of nose-piece fiber openings 124 located on a front section 122 of the nose-piece 120. The nose-piece fiber openings 124 extend through the front section 122 of the nose-piece 120 in a front-to-back orientation. The nose-piece fiber openings 124 are typically aligned in a row.

The nose-piece 120 is movable relative to the connector plug body 110 in a front-to-back orientation. The nose-piece 120 moves between a forward position 134 (shown in FIGS. 1-3) and a rearward position 136 (shown in FIGS. 4-6). A nose-piece spring 128 (see FIGS. 2 and 7) biases the nose-piece 120 towards the forward position 134. A latch 182 (shown in FIG. 1) retains the nose-piece 120 in the forward position 134 via engagement with the front of the connector plug body 110. When the fiber optic connector 100 inserted in the adapter 160, the latch 182 is flexed to disengage from the front of the connector plug body 110 and allow the nose-piece 120 to move to the rearward position 136. Latches 182 can be provided on both sides of the nose-piece 120.

Figure 2:
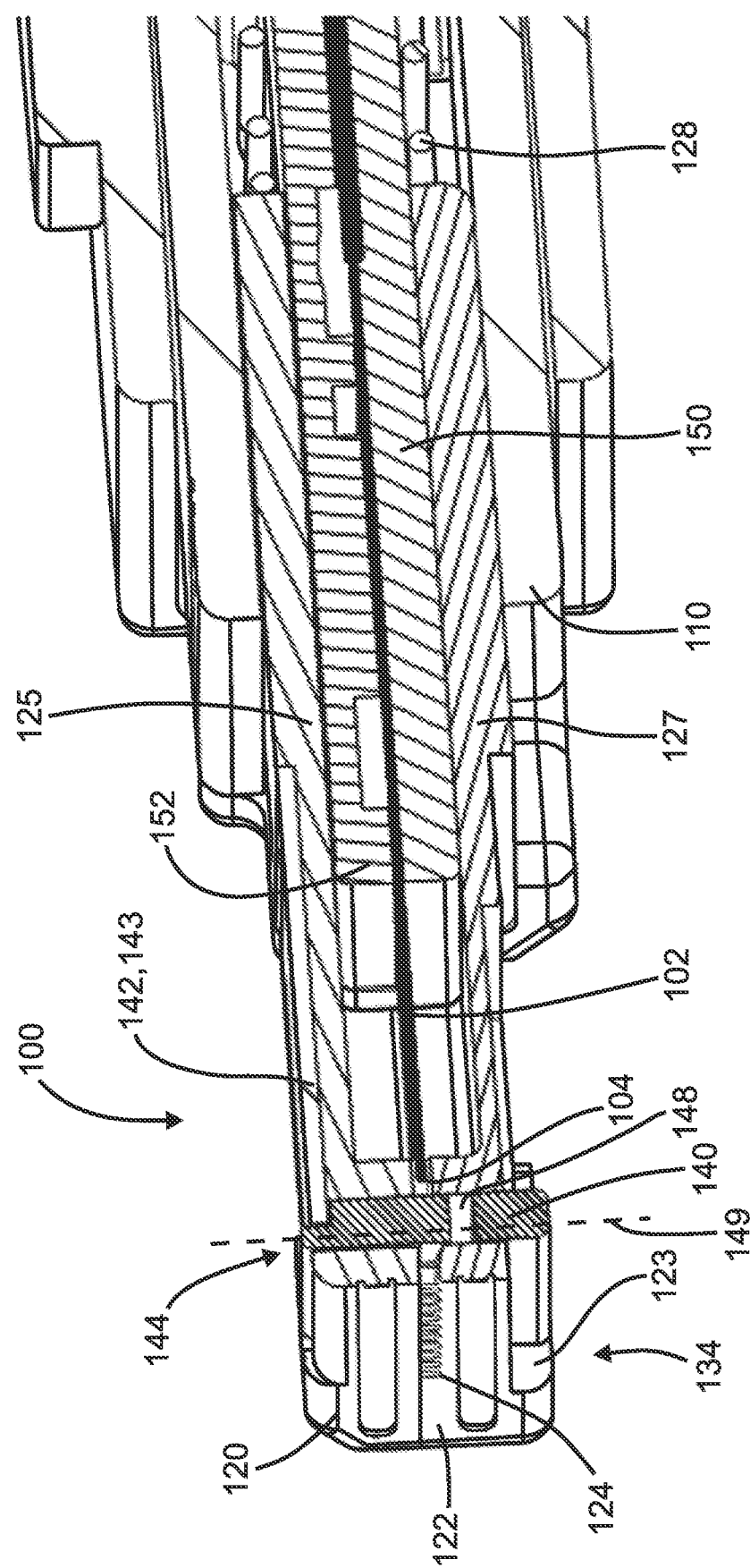
FIG. 2 is a cross-sectional view taken along a section of the fiber optic connector of FIG. 1 with the nose-piece in a forward position.
Figure 5:
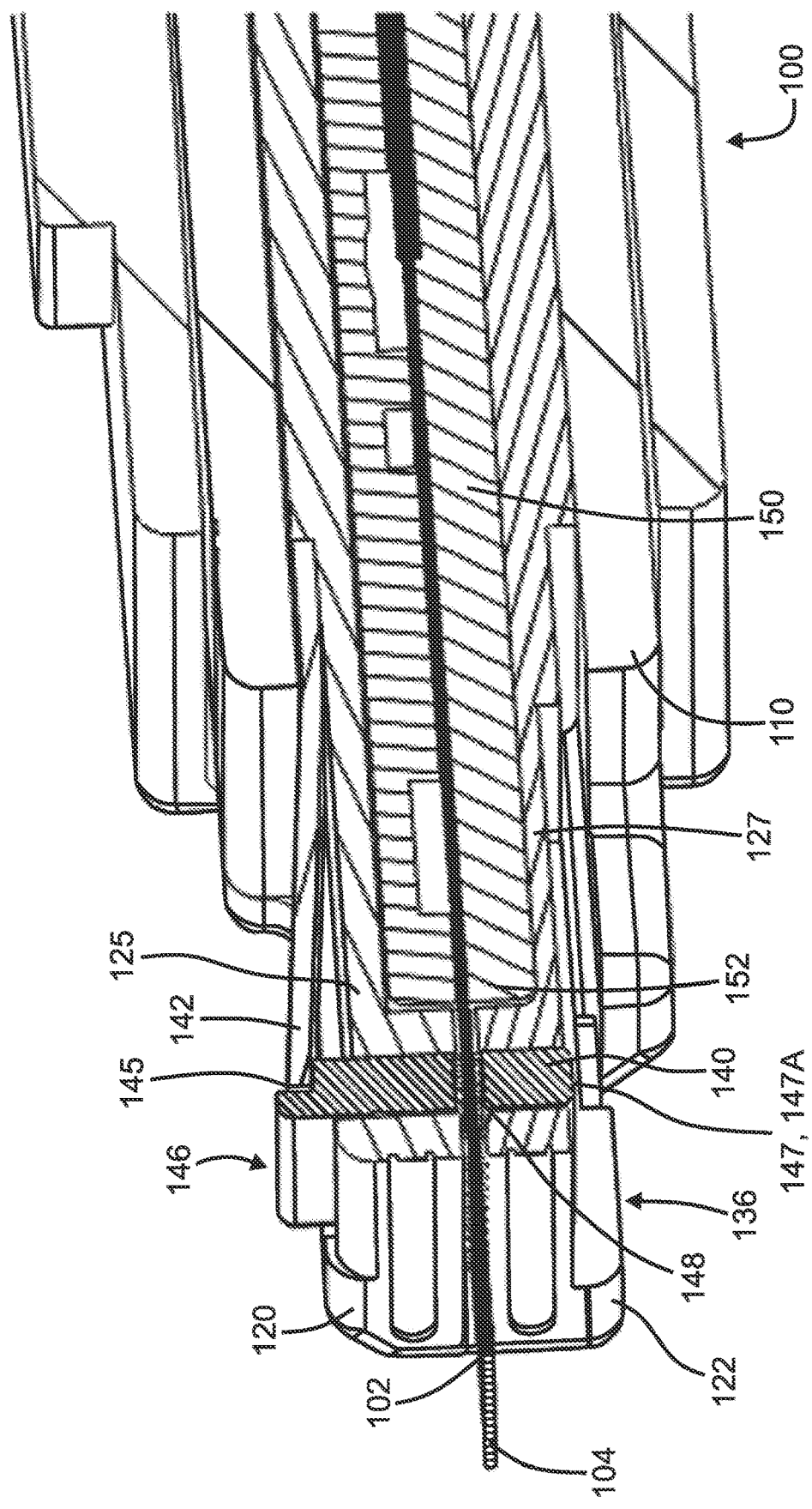
FIG. 5 is a cross-sectional view taken along a section of the optic connector of FIG. 1 with the nose-piece in the rearward position.

The optical fibers 102 of the fiber optic connector 100 are best shown in FIGS. 2 and 5. In particular twelve optical fibers 102 are shown, although other numbers of optical fibers 102 can also be used and multiple rows of optical fibers 102 can also be provided. In a preferred embodiment, the fiber optic connector 100 is ferrule-less meaning that the front free end portions 104 of the optical fibers 102 are not bonded within a rigid ferrule. The plurality of optical fibers 102 have front free end portions 104 that are co-axially aligned with the nose-piece fiber openings 124 of the front section 122 of the nose-piece 120.

The fiber optic connector 100 can also include a fiber anchoring unit 150. The fiber anchoring unit 150 is adhesively bonded to the optical fibers 102 and is mounted in the connector plug body 110.

In some examples, the fiber anchoring unit 150 is mounted to be axially fixed relative to the connector plug body 110. In other examples, the fiber anchoring unit 150 may be mounted to be axially movable relative to the connector plug body 110, and can be spring biased in a forward direction relative to the connector plug body 110. The nose-piece 120 can also include opposite first 125 and second walls 127 (see FIGS. 2 and 5) which extend rearwardly from the front section 122 and are located between the fiber anchoring unit 150 and the connector plug body 110. The first and second walls 125, 127 can slide relative to the optical fibers 102, the fiber anchoring unit 150 and the connector plug body 110 when the nose-piece 120 moves between the forward and rearward positions 134, 136. The front free end portions 104 of the optical fibers 102 project forwardly beyond a front end 152 of the fiber anchoring unit 150.

The fiber anchoring unit 150 can include anchor fiber openings 156a. The anchor fiber openings 156a extend through the fiber anchoring unit 150 along the front-to-back orientation and are coaxially aligned with the plurality of nose-piece fiber openings 124. The anchor fiber openings 156a are positioned rearward with respect to the plurality of nose-piece fiber openings 124. The optical fibers 102 can be adhesively bonded in place inside of the anchor fiber openings 156a.

In some examples, the front free end portions 104 of the optical fibers 102 extend at least 3 millimeters forwardly beyond the front of the nose-piece 120 when the nose-piece 120 is in the rearward position 136. In other examples, the front free end portions 104 of the optical fibers 102 extend at least 4 millimeters forwardly beyond the front of the nose-piece 120 when the nose-piece 120 is in the rearward position 136. In still another example, the front free end portions 104 of the optical fibers 102 extend at least 5 millimeters forwardly beyond the front of the nose-piece 120 when the nose-piece 120 is in the rearward position 136. In a final example, the front free end portions 104 of the optical fibers 102 extend at least 6 millimeters forwardly beyond the front of the nose-piece 120 when the nose-piece 120 is in the rearward position 136.

In some examples, the front free end portions 104 can be cleaved with a right angle cleave in which the end faces are perpendicular relative to the fiber axes. In other examples the optical fibers 102 can be cleaved with an angled cleave in which the end faces of the optical fibers 102 are angled at a non-perpendicular angle relative to the fiber axes (e.g., angled 6-12 degrees, or about 8 degrees with respect to a plane perpendicular to the fiber axes).

Figure 1:
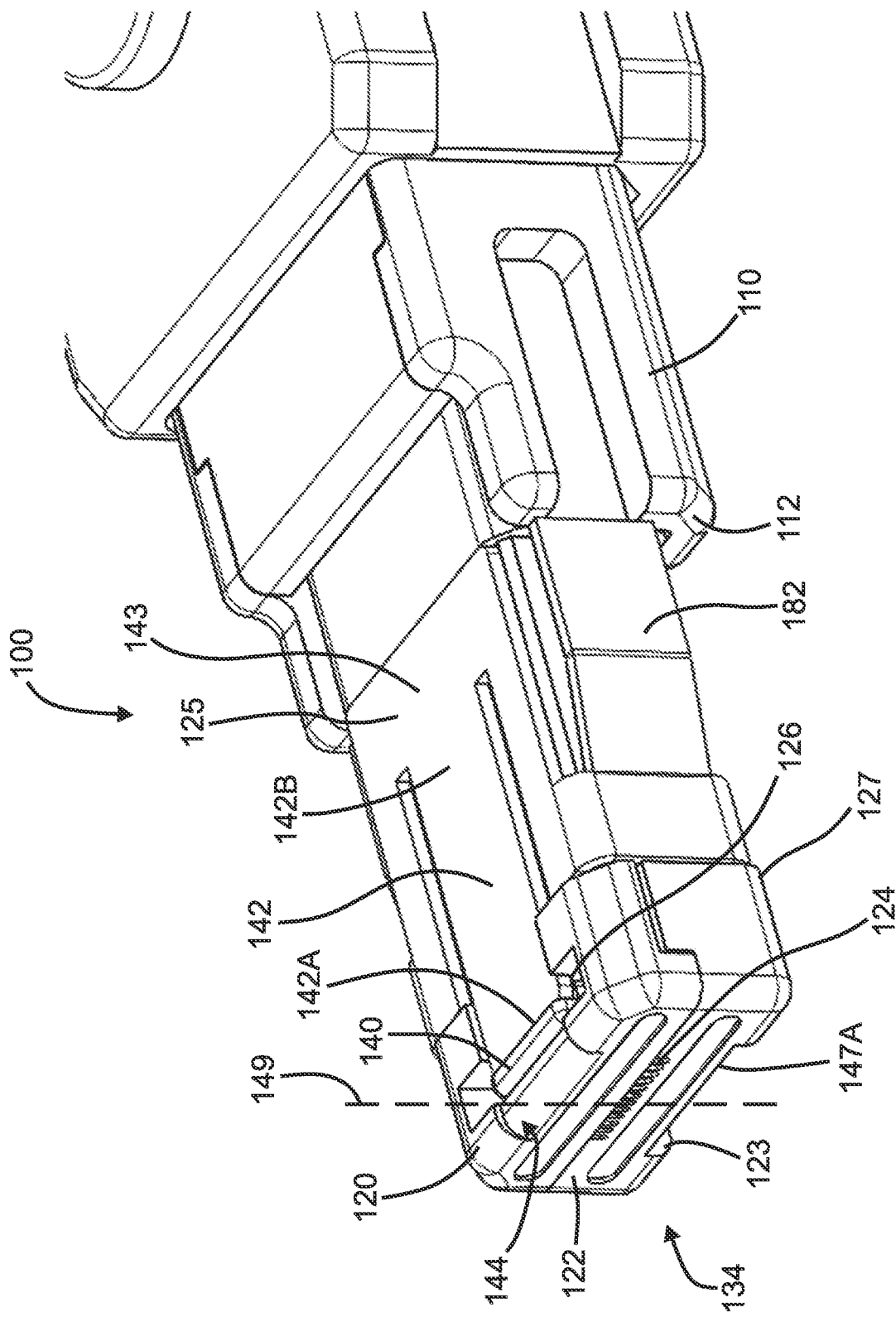
FIG. 1 is a perspective view showing a front end of a fiber optic connector in accordance with the principles of the present disclosure, a nose-piece of the fiber optic connector is shown in a forward position.
Figure 3:
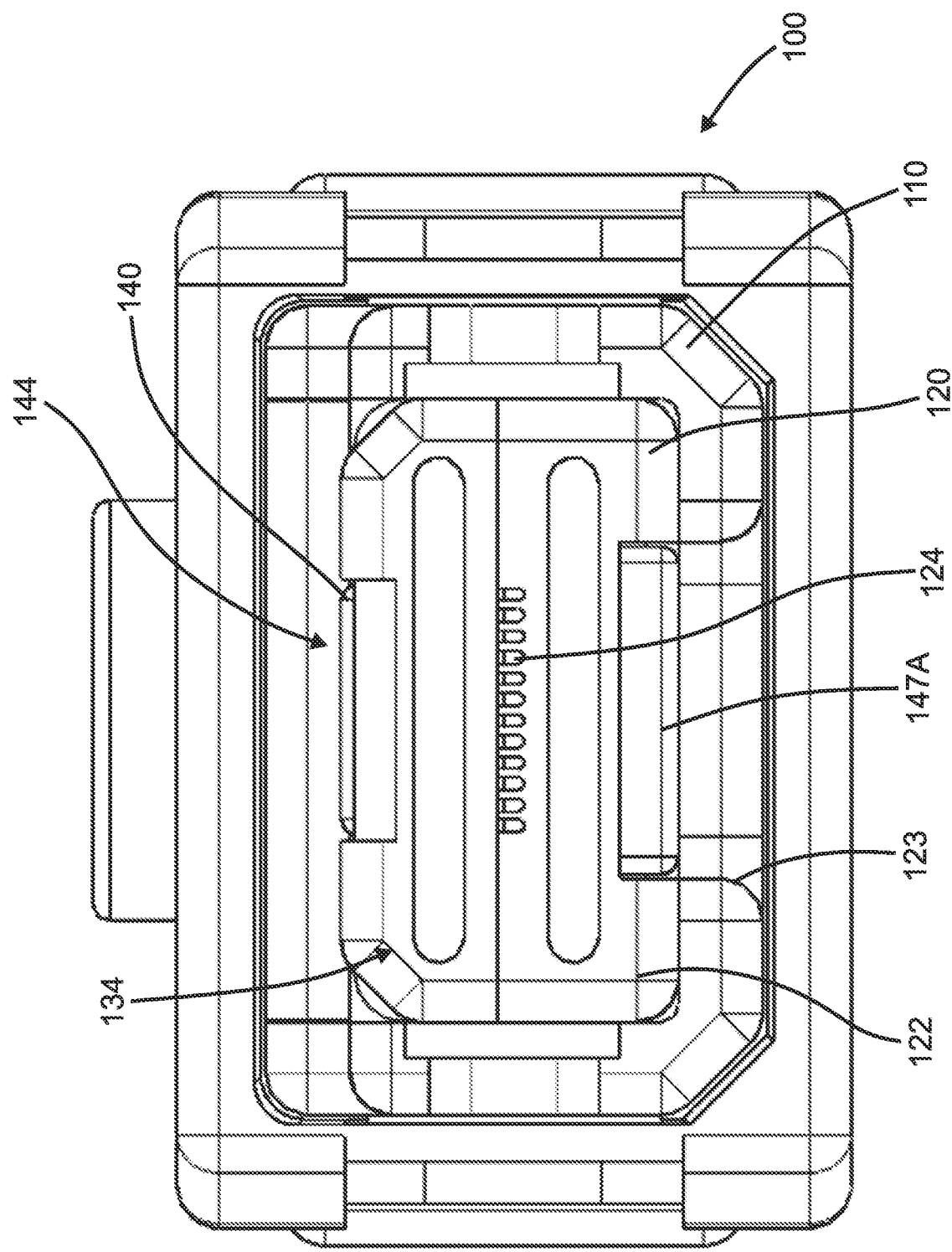
FIG. 3 is a front view of the fiber optic connector of FIG. 1 with the nose-piece in the forward position.
Figure 4:
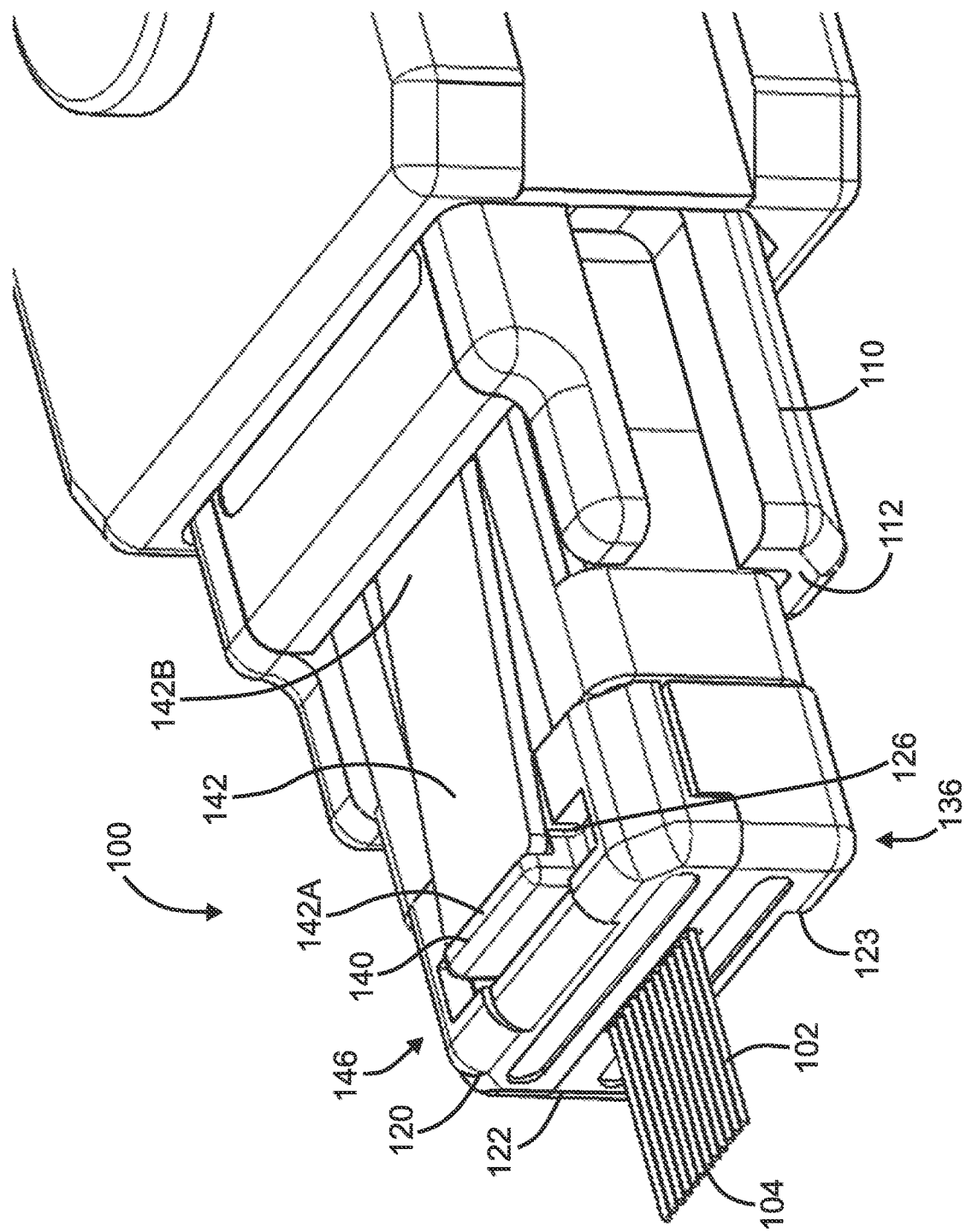
FIG. 4 is perspective view showing the fiber optic connector of FIG. 1 with the nose-piece in a rearward position.
Figure 6:
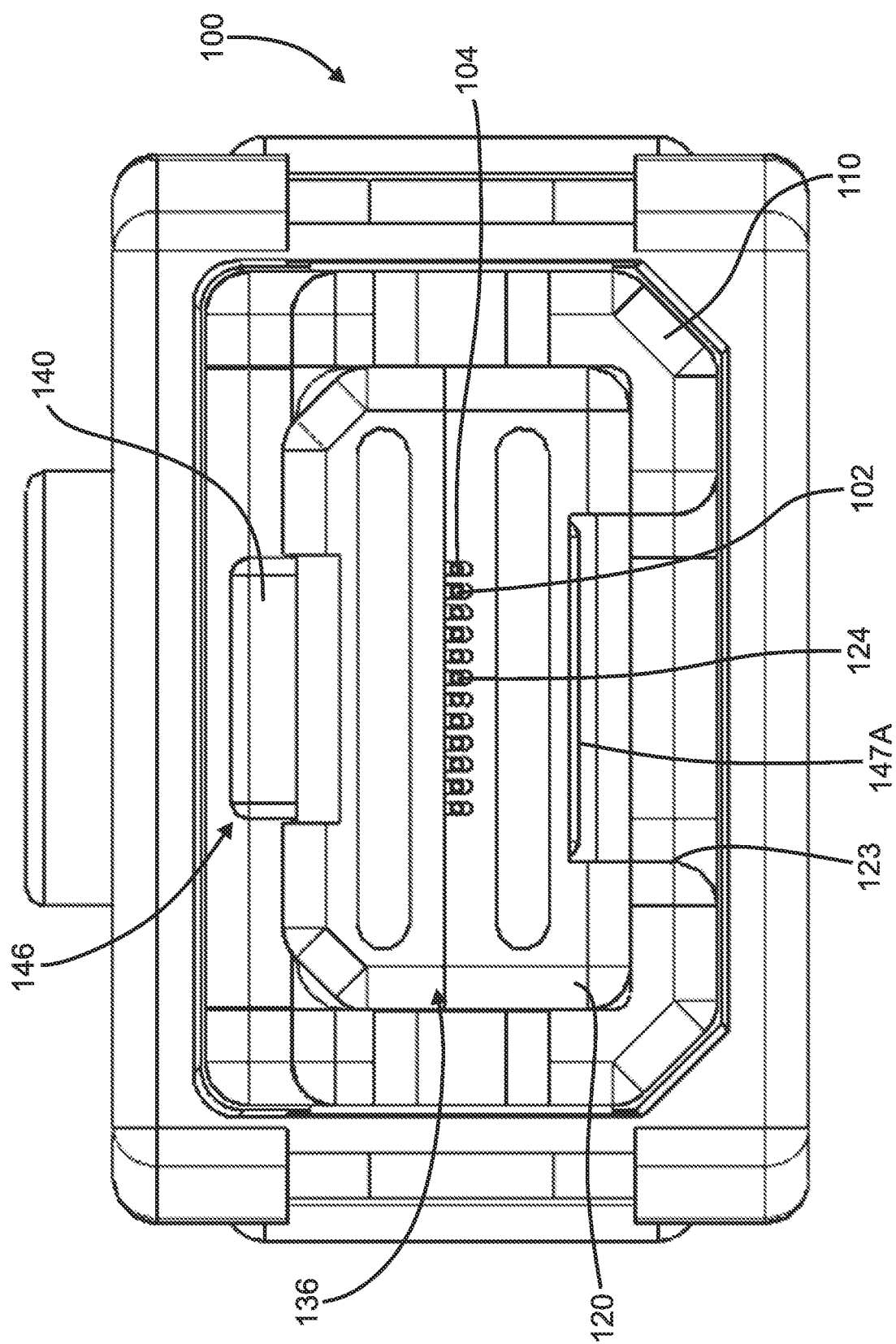
FIG. 6 is a front view of the fiber optic connector of FIG. 1 with the nose-piece in the rearward position.

The fiber optic connector 100 includes a connector shutter 140 which mounts in a receptacle 126 of the nose-piece 120 located behind the front section 122 of the nose-piece 120. The connector shutter 140 is linearly movable between a first position 144 (e.g., a blocking position 174 as shown in FIGS. 1-3) and a second position 146 (e.g., a non-blocking position 176 as shown in FIGS. 4-6). A connector shutter spring 142 biases the connector shutter 140 towards the first position 144. The connector shutter 140 will typically move along a shutter movement axis 149 from the first position 144 and the second position 146. The shutter movement axis 149 is transversely oriented with respect to the front-to-back orientation. The receptacle 126 includes shutter 140 guide surfaces which guide the connector shutter 140 between the first position 144 and the second position 146.

Referring to FIG. 5, the connector shutter 140 includes a first end 145 and a second end 147. The shutter movement axis 149 extends in a direction from the first end 145 to the second end 147 of the connector shutter 140. The shutter spring 142 engages the connector shutter 140 at the first end 145 which biases the connector shutter 140 to the first position 144. The connector shutter spring 142 can have a cantilevered configuration with a base end 142B unitarily formed with the nose-piece 120 and a free end 142A that engages the connector shutter 140. The spring is configured to define a portion of a major wall 143 of the nose-piece 120. The second end 147 defines an actuation surface 147A. The nose-piece 120 can define an access notch 123 which is in alignment with the actuation surface 147A.

The access notch 123 can allow for a shutter actuation surface 168 provided by the adapter 160 (see FIGS. 7 and 8) to pass through the front section 122 in the front-to-back orientation to engage the actuation surface 147A of the connector shutter 140 to cause movement of the connector shutter 140 from the first position 144 to the second position 146 when the fiber optic connector 100 is inserted into one of the adapter ports 164A, 164B of the adapter 160. The adapter 160 can also include a structure for disengaging the nose-piece latch 182 and structure for causing the nose-piece 120 to retract as the fiber optic connector 100 is inserted in the adapter port 164A, 164B.

When the nose-piece 120 is in the forward position 134, shown in FIGS. 1-3, connector shutter 140 remains in the first position 144. When the connector shutter 140 is in the first position 144 the connector shutter 140 blocks the nose-piece fiber openings 124 of the nose-piece 120 and the front free end portions 104 of the optical fibers 102 are protected behind the connector shutter 140.

When the nose-piece 120 is in the rearward position 136, as shown in FIGS. 4-6, the connector shutter 140 is in the second position 146. This allows the optical fibers 102 to extend forwardly past the connector shutter 140 through the nose-piece fiber openings 124 of the front section 122 of the nose-piece 120 and beyond the front section 122 of the nose-piece 120.

The connector shutter 140 can define at least one opening 148 that aligns with the nose-piece fiber openings 124 when the connector shutter 140 is in the second position 146. In this particular example only one opening 148 is shown. The opening 148 is configured for receiving the optical fibers 102 to allow the optical fibers 102 to extend through the connector shutter 140. In other examples, the shutter 140 can include separate openings 148 corresponding to each fiber.

Referring again to FIGS. 7-8, the fiber optic adapter 160 is shown. The fiber optic adapter ports 164A, 164B each provide one of the shutter actuation structures 168 adapted to engage the actuation surface 147A of the connector shutter 140 as the fiber optic connector 100 is inserted into either of the ports 164A, 164B. In this particular adapter 160, the shutter actuation structures 168 are located on different sides of each port 164A, 164B. This ensures that the connectors received in the ports 164A, 164B are rotated 180 degrees with respect to each other to make sure that if the optical fibers 102 of the connectors have angled cleaves, the end faces of the optical fibers 102 corresponding to the connectors received within the opposite adapter ports 164A oppose one another and are parallel.

In another aspect, the fiber optic adapter 160 can include an adapter shutter 170. The adapter shutter 170 is linearly movable between a blocking position 174 and a non-blocking position 176. The fiber optic connector 100 moves the adapter shutter 170 from the blocking position 174 to the non-blocking position 176 as it enters the port 164A, 164B via a cam-like structure (e.g., a ramp).

As the fiber optic connector 100 is inserted into one of the ports 164A, 164B of the fiber optic adapter 160, the shutter actuation structure 168 engages the actuation surface 147A of the second end 147 of the connector shutter 140 of the fiber optic connector 100 and the latches 182 of the nose-piece 120 engage with the side of the adapter 160. This disengages the latches 182 from the front of the connector plug body 110, moves the connector shutter 140 from the first position 144 to the second position 146 against the bias of the shutter spring 142 and aligns the opening 148 of the connector shutter 140 with the optical fibers 102. As the fiber optic connector 100 continues into the fiber optic adapter 160, the fiber optic connector 100 moves the adapter shutter 170 linearly from a blocking position 174 to a non-blocking position 176 via the cam-like structure. Concurrently, the nose-piece 120 of the fiber optic connector 100 is forced to move from the forward position 134 to the rearward position 136 as the fiber optic connector 100 is inserted into the port 164. Movement of the nose-piece 120 toward the rearward position 136 is against the bias of the nose-piece spring 128. As the nose-piece 120 of the fiber optic connector 100 moves from the forward position 134 to the rearward position 136, the optical fibers 102 extend beyond the connector shutter 140 and through the nose-piece fiber openings 124 of the front section 122 of the nose-piece 120 and forwardly beyond the front section 122 of the nose-piece 120. The rear portion of the nose-piece 120 enters the connector plug body 110. This allows the optical fibers 102 extend into the fiber alignment structure 162 of the fiber optic adapter 160 for aligning bare optical fibers of the two mated fiber optic connectors 100.

When fiber optic connectors 100 are respectively inserted into the first 164A and second port 164B, the front free end portions 104 of the optical fibers 102 meet and align in the fiber alignment structure 162 (e.g., a bare fiber alignment system) of the fiber optic adapter 160 which co-axially aligns the optical fibers 102 of the fiber optic connectors 100 received in the ports 164A, 164B to provide optical connections there between.

When the fiber optic connector 100 is removed from its corresponding port 164A, 164B the sequence of movement is reversed. For example, as the fiber optic connector 100 is withdrawn from the fiber optic adapter 160, the optical fibers 102 retract from the fiber alignment structure 162, the nose-piece 120 is pushed forward by the nose-piece spring 128. The optical fibers 102 return inside of the nose-piece 120, through the nose-piece fiber openings 124 and behind the connector shutter 140. The adapter shutter 170 returns linearly from a non-blocking position 176 to a blocking position 174 as the fiber optic connector 100 disengages with the cam-like structure. The connector shutter 140 then disengages from the actuation structure 168 and returns to its place in the first position 146 via the shutter spring 142 in front of the optical fibers 102. The latches 182 reengage with the connector plug body 110 securing the nose-piece 120 in the forward position 134.

In FIGS. 9-12 another fiber optic connector 200 in accordance with the principles of the disclosure is shown. The fiber optic connector 200 is similar to the fiber optic connector 100 of FIGS. 1-6. The main difference is that the fiber optic connector 200 of FIGS. 9-12 is configured to include more optical fibers 202. In this particular arrangement twelve sets of twelve optical fibers 202 are shown.

In the fiber optic connector 200, the connector shutter 240 extends and moves along the shutter movement axis 249 and is adapted to accommodate a greater number of optical fibers 202. The shutter 240 defines openings 248 to allow the fibers 202 to extend through the shutter 240. In this example there are twelve shutter openings 248.

The fiber optic connector 200 is shown in FIG. 9-10 with the nose-piece 220 in the forward position 234. In the forward position 234 all sets of the optical fibers 202 are shown behind the connector shutter 240 which is in the first position 244. The shutter openings 248 are not aligned with the optical fibers 202 and the shutter spring 242 is biasing the connector shutter 240 to first position 244. The fiber optic connector 200 is attached to a cable 292 (also shown in FIG. 11) end which provides the optic fibers 202.

In FIGS. 11-12 the fiber optic connector 200 is shown with the nose-piece 220 in a rearward position 236. In the rearward position 236, the bare ends of the optical fibers 202 extend beyond the openings 248 defined by the connector shutter 240 and beyond the front section 222 of the nose-piece 220. The connector shutter 240 is shown in the second position 246 allowing for the optical fibers 202 pass through the shutter openings 248. The shutter spring 242 is extended in an upwards position.

Figure 13:
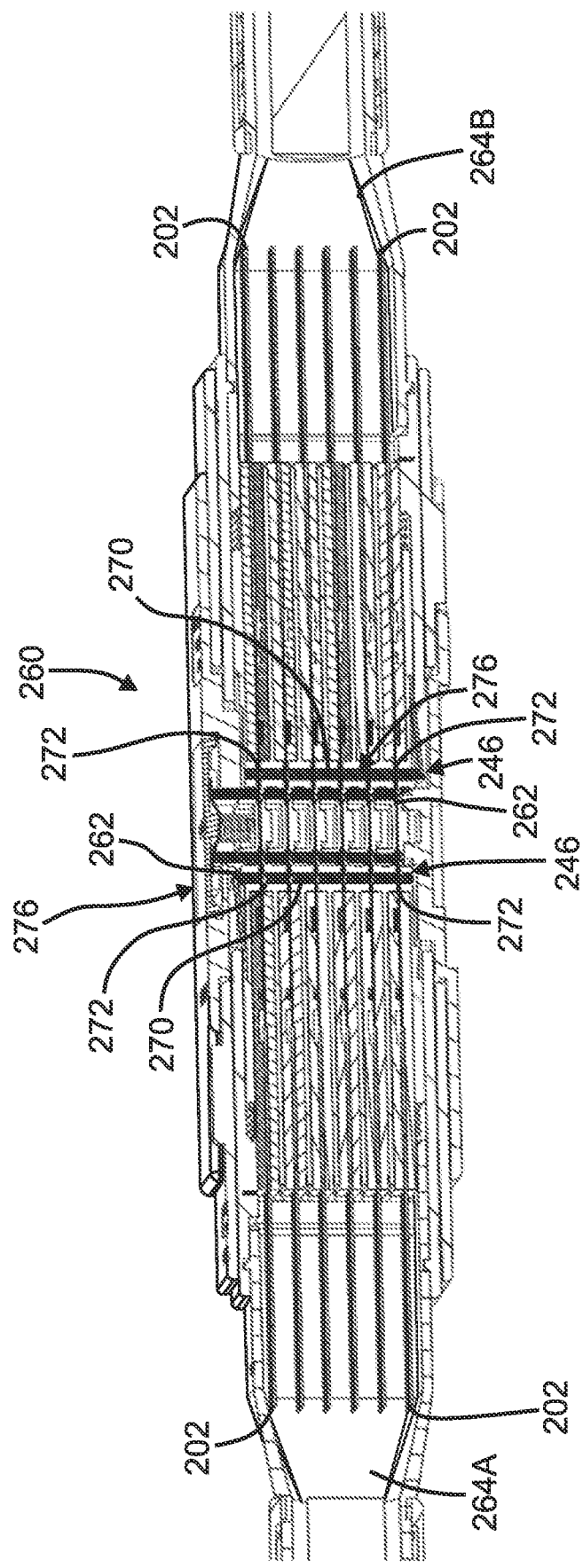
FIG. 13 is a cross-sectional view showing two of the fiber optic connectors of FIG. 9 optically coupled together by a fiber optic adapter.
Figure 14:
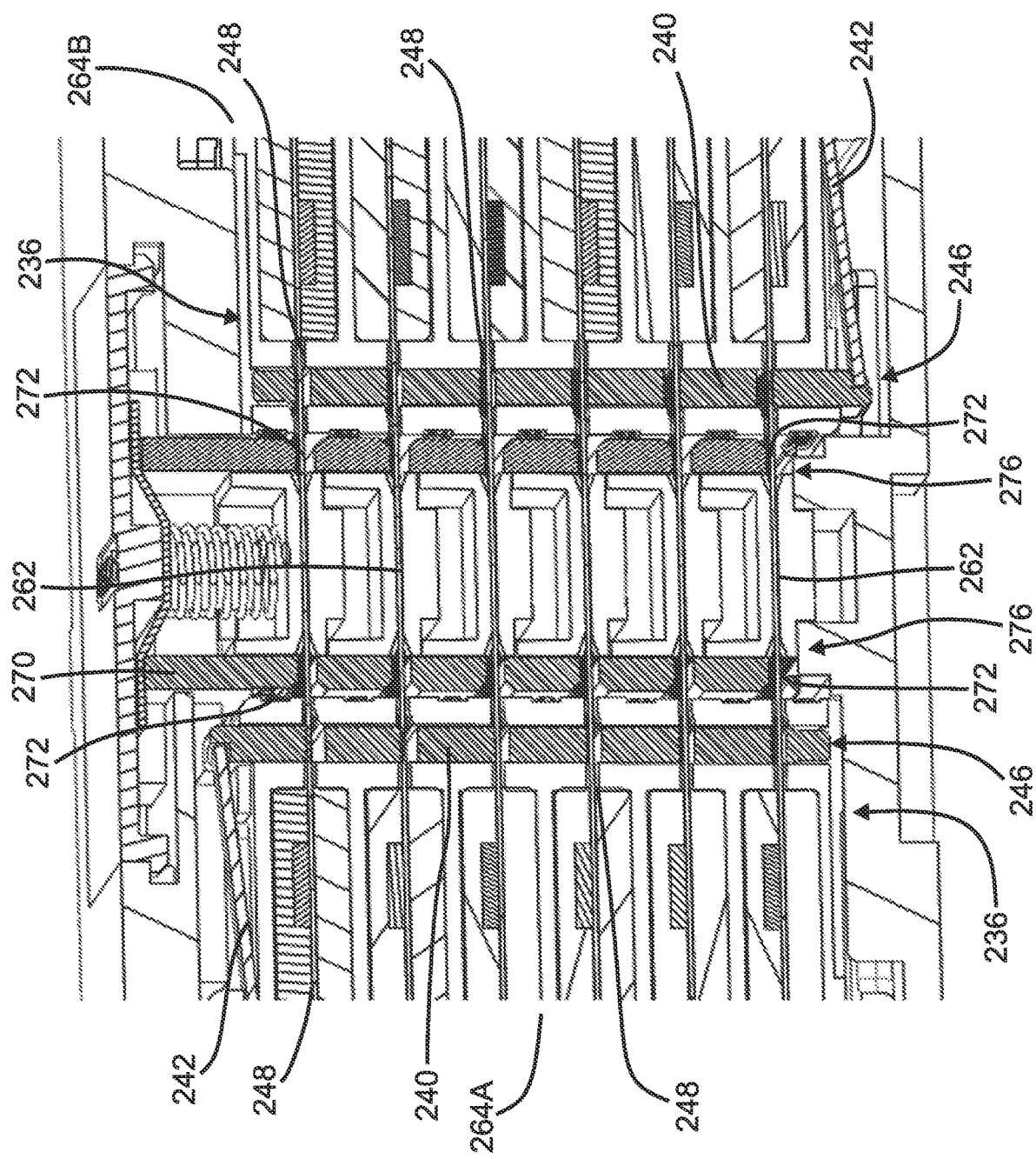
FIG. 14 is an enlarged view of a portion of FIG. 13.
Figure 15:
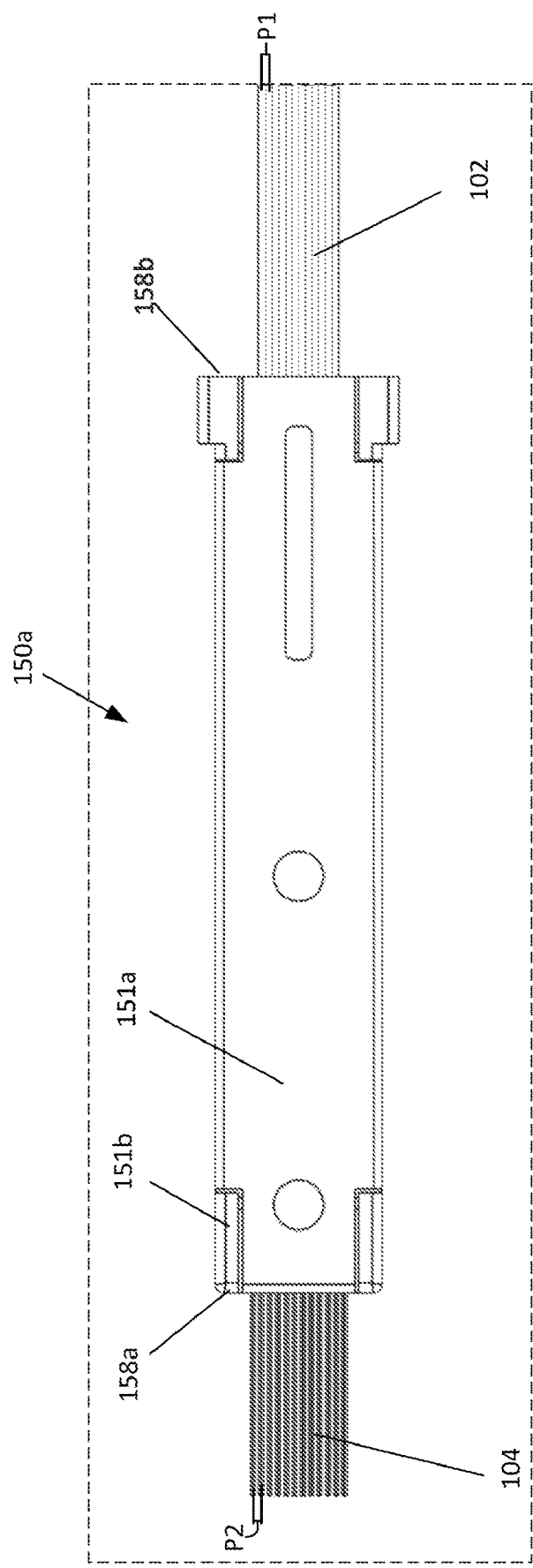
FIG. 15 is a view of a fiber anchoring unit in accordance with the principles of this disclosure.

In FIGS. 13 and 14 a fiber optic adapter 260 in accordance with the principles of this disclosure is shown. The fiber optic adapter 260 is similar to the fiber optic adapter 160 shown in FIGS. 7-8 but it is adapted to receive a fiber optic connector 200 with twelve arrangements of optical fibers 202. The fiber optic adapter 260 is shown with a first and second fiber optic connector 200 entering the opposite ports 264A, 264B. The fiber optic connectors 200 are both in a rearward position 236 and the adapter shutter 270 is shown in a non-blocking position 276. This allows the optical fibers 202 to be received in a fiber alignment structure 262 of the adapter 260. As the fiber optic adapter 260 is adapted to receive multiple arrangements of optical fibers 202, there are multiple fiber alignment structures 262 which correspond to each arrangement of optical fibers 202 which provide alignment for the optical fibers 202. Additionally, the adapter shutter 270 that is shown in the non-blocking position 276 defines a plurality of openings 272 allowing the optical fibers 202 to pass into the fiber alignment structures 262. In this example there are twelve openings 272. In this example there are twelve alignment structures 262 which provide alignment for each of the optical fibers 202 as they meet and form an optical connection.

The fiber alignment structures 162, 262 can define alignment grooves for receiving and aligning the optical fibers 102, 202. The alignment grooves can be defined by structures such as substrates which may each define one or more grooves. The substrates can include members such as plates which may have a ceramic construction, a metal construction, a plastic construction or other constructions. The alignment grooves can include grooves having V-shaped cross-sections (e.g., v-grooves) grooves having u-shaped cross-sections, grooves having trough-shaped cross-sections, grooves having half-circle shaped cross-sections or grooves having other shapes. In other examples, alignment grooves in accordance with the principles of the present disclosure can be defined by parallel cylindrical rods oriented in a side-by-side relationship. Various fiber alignment structures 162, 262 defining grooves are disclosed by PCT International Publication Number WO 2018/020022, which is hereby incorporated by reference in its entirety. In certain examples, index matching gel can be used between opposing ends of optical fibers 102, 202 aligned within the alignment structures 162, 262.

Figure 16:
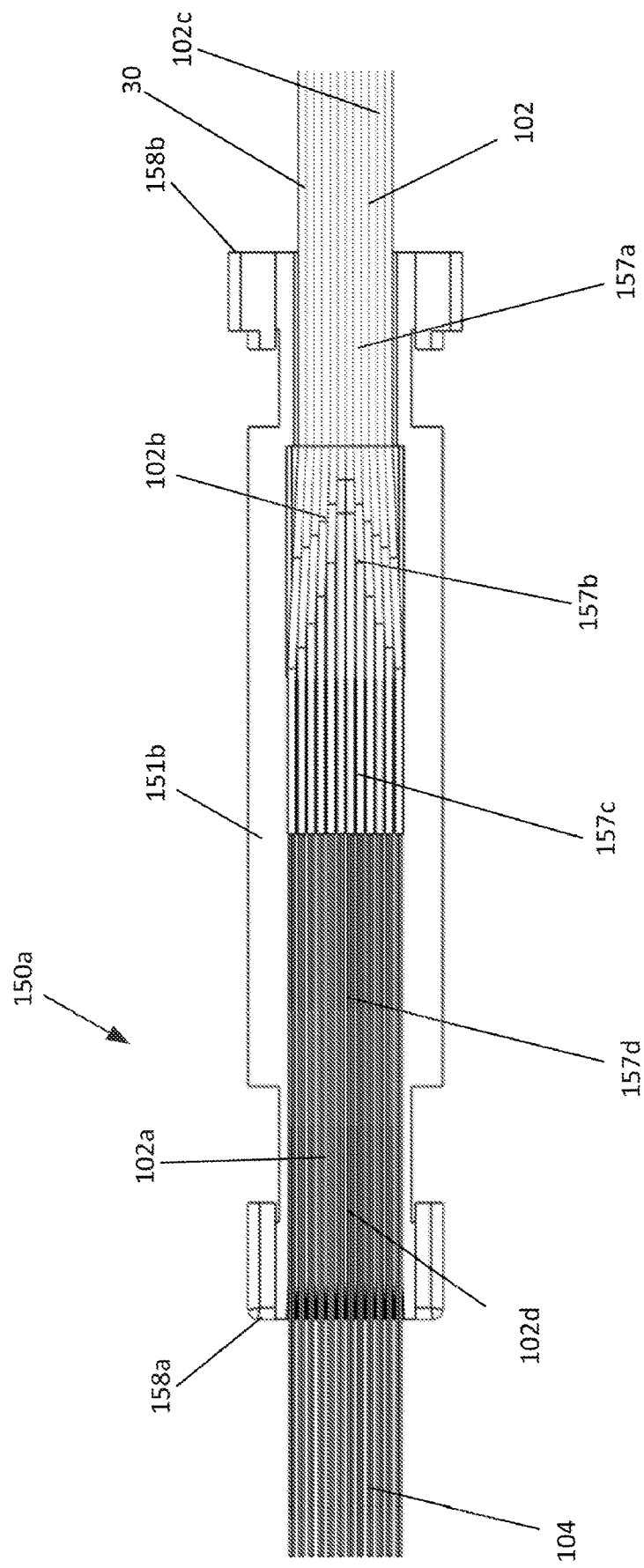
FIG. 16 is a view of the fiber anchoring unit of FIG. 15 with a top piece removed.
Figure 17:
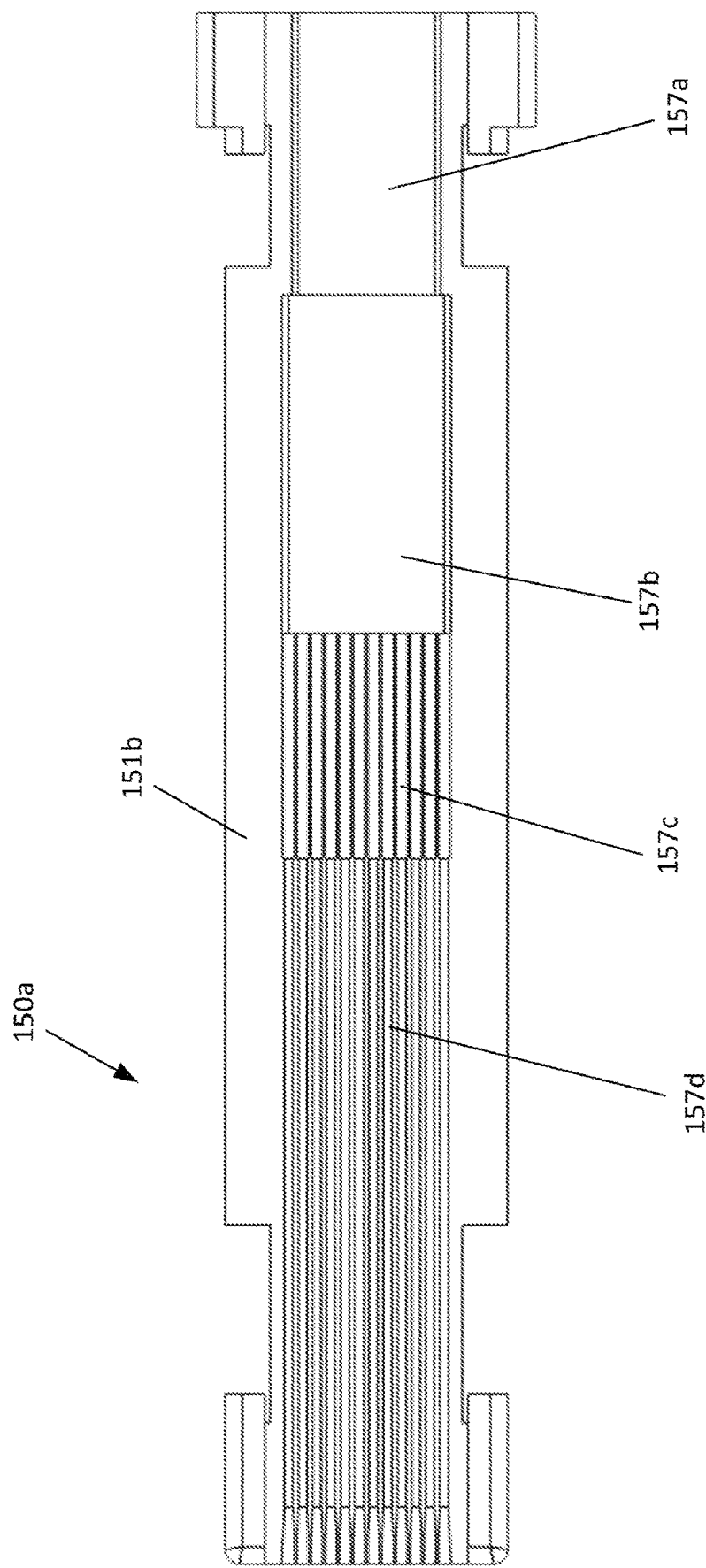
FIG. 17 is a view of the fiber anchoring unit of FIG. 16 with a plurality of optical fibers removed.
Figure 18:
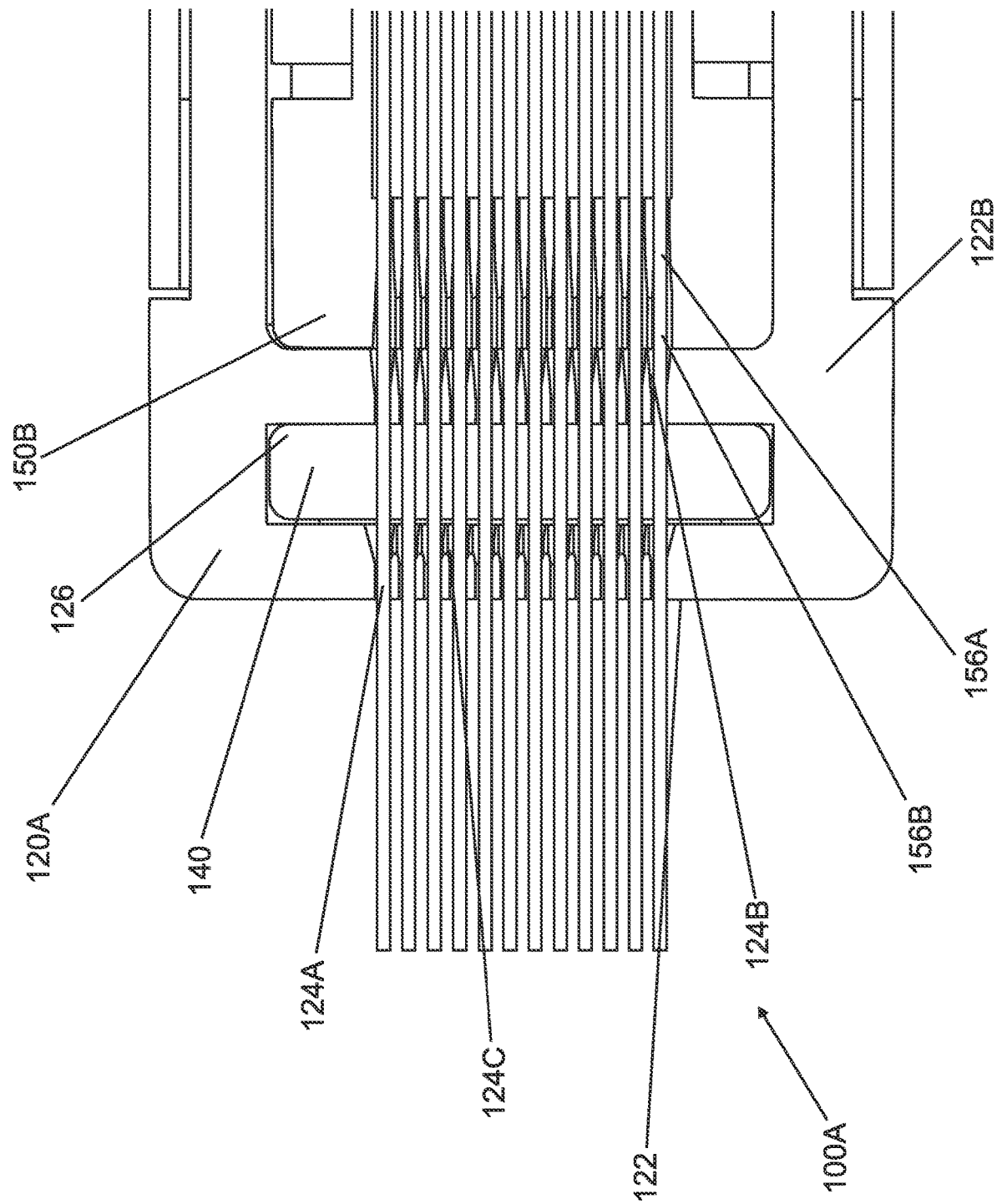
FIG. 18 is a cross-sectional view of a fiber optic connector in accordance with the principles of this disclosure.

Referring to FIG. 16-18, a fiber anchoring unit 150a is shown in accordance with the principles of this disclosure is shown. The fiber anchoring unit 150a can be used in place of the anchoring unit 150 in bare fiber connectors such as any of the bare fiber connectors disclosed herein to provide fiber optic pitch conversion within the connectors.

The fiber anchoring unit 150a is similar to the fiber anchoring unit 150 described above. The fiber anchoring unit 150a has a front end 158a, and a back end 158b. The optical fibers 102 extend through the fiber anchoring unit 150a in a front-to-back orientation. The forward free end portions of the optical fibers 102 extend forwardly from the front end of the fiber anchoring unit 150a. The fiber anchoring unit 150a has a top piece 151a and a bottom piece 151b.

The optical fibers 102 at the back end 158b have a first pitch P1 and a second pitch P2 at the front end 158a, wherein pitch means the center to center spacing of the optical fibers 102. The first pitch P1, or center-to-center spacing of the optical fibers 102, is less than the second pitch P2. In one aspect, the first center to center spacing can be 200 microns and the second center to center spacing is 250 microns.

Referring to FIG. 16, the fiber anchoring unit 150a is shown with the top piece 151a removed showing the optical fibers 102. The optical fibers 102 are shown including a front fiber section 102a, a rear fiber section 102c, and an intermediate fiber section 102b located between the front and rear fiber sections 102a, 102c. The optical fibers 102, at the front fiber section 102a, have a bare optical fiber configuration, bare fiber meaning each fiber includes a core surrounded by a cladding layer and that do not include a coating layer surrounding the cladding layer. The front section 102a includes the front free end portions 104 of the optical fibers 102. The optical fibers 102 have a coated de-ribbonized configuration at the intermediate section 102b and a ribbonized configuration at the rear section 102c.

Figure 16A:
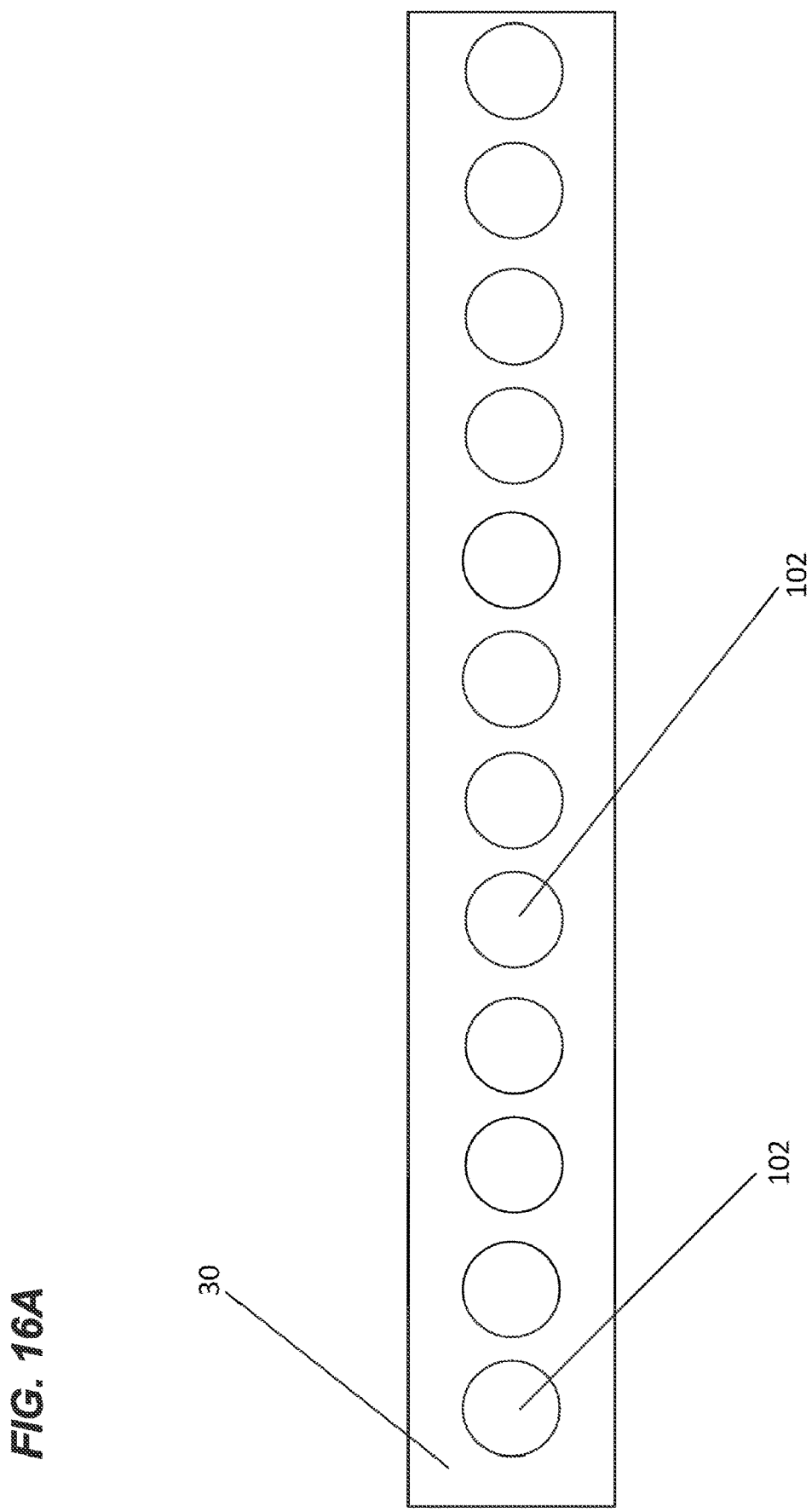
FIG. 16A is a cross-sectional view of an example ribbonized group of optical fibers.

A cross section of an example ribbonized group of optical fibers is shown in FIG. 16a. Ribbonized means that a matrix material 30 encases the coated fibers thereby holding the optical fibers 102 in a row and preventing them relative movement between the fibers. In other examples a rollable ribbon configuration can be used in which the fibers are maintained in a particular order by interconnections between the individual fibers. De-ribbonized means that the optical fibers are not bonded together and are capable of moving relative to on another. The pitch transitions from the first pitch P1 to the second pitch P2 at the intermediate section 102b after the ribbon is in the de-ribbonized configuration. The de-ribbonized configuration allows relative movement between the optical fibers allowing the optical fibers to transition from the first pitch P1 to the second pitch P2.

The coating layer is removed from the optical fibers 102 at the intermediate section 102b after the pitch has transitioned from the first pitch P1 to the second pitch P2. Thus resulting in the bare optical fiber configuration of the front section 102a.

Referring to FIG. 17, the fiber anchoring unit 150a is shown with the optical fibers 102 and the top piece 151a removed. The fiber anchoring unit 150a is shown including a first section 157a adjacent the back end 158b of the fiber anchoring unit 150a, a second section 157b in front of the first section 157a, a third section 157c in front of the second section 157b, and a fourth section 157d in front of the third section 157c.

The first section and second section 157a, 157b are shown without including grooves, the third, and fourth sections 157c, 157d define fiber grooves that extend from the ending of the second section 157b to the front end of the fiber anchoring unit 150a. The first section 157a of the fiber anchoring unit 150a includes a rectangular ribbon receptacle.

The optical fibers diverge from one another at the second section 157b and extend toward the grooves of the third section 157c. The fiber grooves are parallel to one another and define the second pitch P2, or center to center spacing, at the third and fourth sections 157b. The fiber grooves have a first depth at the third section 157c and a second depth at the fourth section 157d, the second depth is shallower than the first depth. The fiber grooves can be V-grooves, grooves having u-shaped cross-sections, grooves having trough-shaped cross-sections, grooves having half-circle shaped cross-sections or grooves having other shapes.

As can be seen in FIGS. 16 and 17 and is described above, a ribbonized group of optical fibers, meaning the optical fibers 102 are encased in a matrix material 30, can be inserted into the first section 157a. The group of optical fibers 102 are de-ribbonized at the second section 157b allowing the optical fibers 102 to be individually separated and diverge to the second pitch in the third section 157c, which includes grooves. The coating of the optical fibers 102 is removed in the fourth section 157d for the bare optical fiber configuration. The depth of the grooves is preferably deeper, defining the second depth, at the third section 157c as the optical fibers 102 have the coating at the third section and the coating is removed allowing the optical fibers 102 to remain coaxially aligned as they extend through the fiber anchoring unit 150a.

The rear fiber section 102c is located at the first section 157a, the optical fibers 102 are ribbonized and coated. The intermediate fiber section, where the optical fibers 102 are de-ribbonized, is positioned at the second and third sections 157b, 157c of the fiber anchoring unit 150a. The front fiber section 102a is positioned at the fourth section 157d of the fiber anchoring unit 150a.

Figure 19:
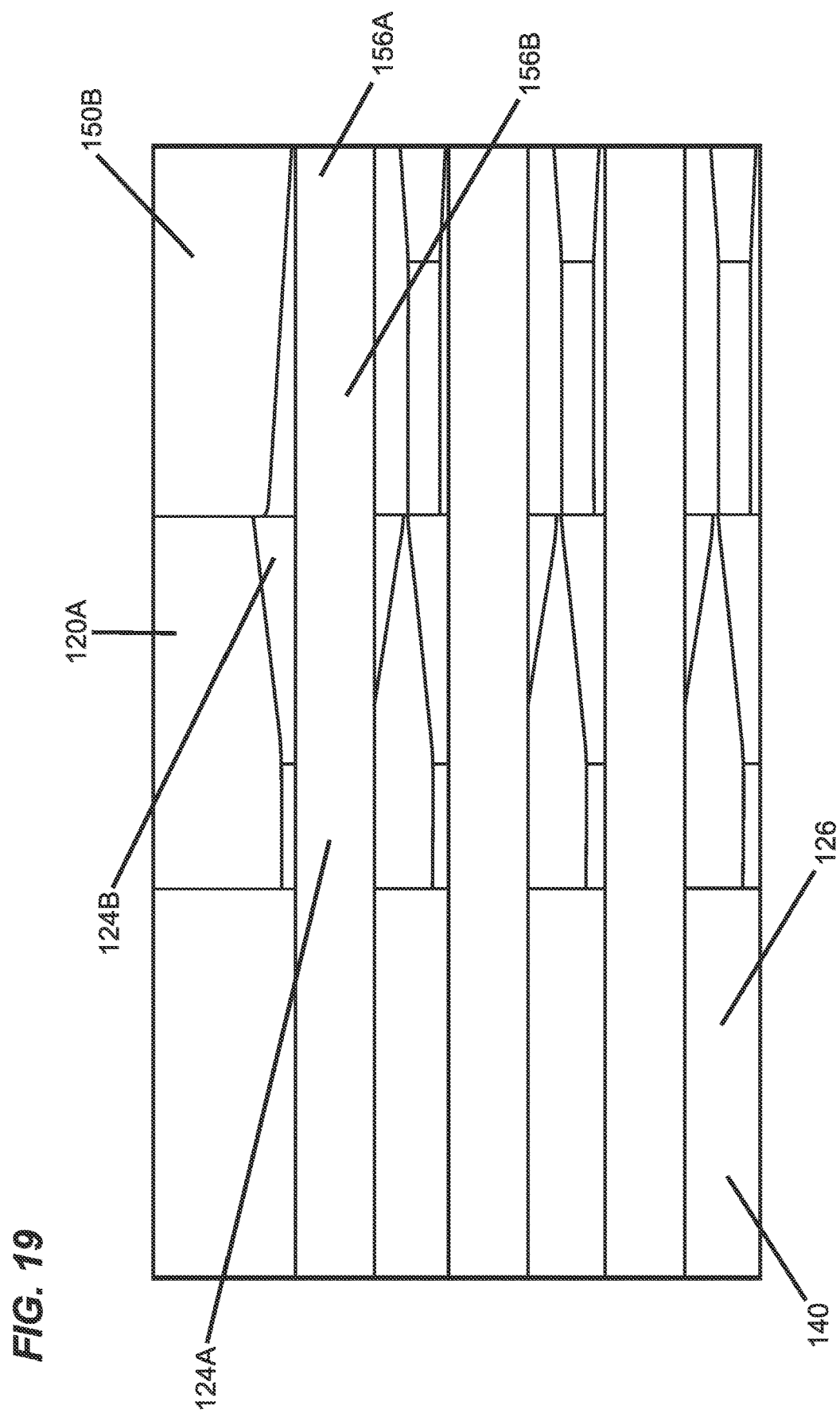
FIG. 19 is an enlarged view of the fiber optic connector of FIG. 18.

Referring to FIGS. 18 and 19, a sectional view of a fiber optic connector 100a is shown. The fiber optic connector 100a has a similar configuration to the fiber optic connector 100 except features have been provided to enhance fiber transitions between various components of the connector 100a. For example, the fiber optic connector 100a includes a modified anchoring unit 150b, this anchoring unit 150b is similar to the anchoring units 150, 150a discussed above, except anchor fiber openings 156a with tapered transitions have been provided.

The fiber optic connector 100 additionally includes a nose-piece 120a. The nose-piece 120a is similar to the nose-piece 120 discussed above but includes features to enhance fiber transitions between various components of the connector 100a. The nose-piece 120a includes fiber openings 124a. The nose piece has a front section 122 and a rear section 122b. The rear section 122b is behind the receptacle 126 and the connector shutter 140 and in front of the anchoring unit 150b.

The fiber openings of the nose-piece 120a extend through the front section 122 and the rear section 122b. The fiber openings 124a include tapered portions 124b. The tapered portions 124b are located on the rear section 122b of the nose-piece 120a. The tapered portions 124b expand as the fiber openings 124a extend rearwardly toward the fiber anchoring unit 150b from the receptacle 126.

The anchor fiber openings 156a have tapered sections 156b at the front of the anchoring unit. The tapered sections 156b are adjacent to the fiber openings 124a of a nose-piece 120a at the rear section 122b. The tapered sections 156b expand as they extend in a forward direction toward the tapered portions 124b of the fiber openings 124a at the rear section 122b of the nose-piece 120a.

The tapered portions 124b, 156b of the nose-piece 120a and the anchoring unit 150b can help prevent microbends which can be caused from part misalignment as the optical fibers 102 extend from the anchoring unit to the nose-piece. Part misalignment can be caused by tolerances of the various parts. In this case, as the optical fiber enters the nose-piece 120a from the anchoring unit 150a, there is additional space to account for part misalignment rather than a sharp edge.

In another aspect, the fiber openings 124a of the nose-piece 120a can include additional tapered portions 124c (shown in FIG. 18) which extend rearwardly from the front section 122 of the nose-piece 120a towards the receptacle 126. The additional tapered portions 124c allow for additional room to help prevent part misalignment as the optical fiber enters the front portion of the nose-piece from the shutter openings 148 of the connector shutter 140. The additional tapered 124c portions expand as they extend in a rearward direction toward the shutter.

The fiber openings 124a the nose-piece 120a can also include other sets of tapered portions. In one example, additional tapered portions can be included on the front section 122 of the nose-piece 120a and expand as the openings extend from the receptacle 126 to the front section 122, providing additional room for the optical fibers 102 as the optical fibers 102 exit the nose-piece 120a to an adapter.

In a different example, the fiber openings 124a of the nose-piece 120a can include additional tapered portions on the rear portion 122b of the nose-piece 120a which expand as the openings 124a extend from the anchoring unit 150a towards the receptacle 126, providing additional room for the optical fibers 102 as they enter the connector shutter from the rear portion of the nose-piece.

If the connector shutter 140 includes individual openings for each optical fiber, tapers can be added to each opening. The tapers can expand as the connector shutter openings extend through the connector shutter 140 towards the front section of the nose-piece 120a where the optical fibers 102 exit the connector shutter 140. Tapers can also be added to the openings of the connector shutter 140 which expand rearwardly towards the rear portion 122b of the nose-piece 120a where the optical fibers 102 enter the connector shutter 140.

The various examples described above are provided by way of illustration only and should not be construed to limit the scope of the present disclosure. Those skilled in the art will readily recognize various modifications and changes that may be made with respect to the examples and applications illustrated and described herein without departing from the true spirit and scope of the present disclosure.

What is claimed is:

1. A fiber optic connector comprising:
   a connector plug body having a front end and an opposite back end;
   a nose-piece mounted at the front end of the connector plug body, the nose-piece defining a plurality of nose-piece fiber openings defined by a front section of the nose-piece, the nose-piece fiber openings extending through the front section of the nose-piece in a front-to-back orientation, the nose-piece being moveable relative to the connector plug body along the front-to-back orientation between a forward position and a rearward position, the nose-piece defining a receptacle behind the front section including connector shutter guide surfaces;
   a nose-piece spring for biasing the nose-piece toward the forward position;
   a connector shutter that mounts in the receptacle of the nose-piece behind the front section of the nose-piece, the connector shutter being linearly moveable relative the nose-piece between a first position in which the connector shutter blocks the nose-piece fiber openings and a second position in which the nose-piece fiber openings are not blocked, the connector shutter being guided between the first and second positions by the connector shutter guide surfaces of the nose-piece;

a connector shutter spring that biases the connector shutter toward the first position; and a plurality of optical fibers that extend through the connector plug body, the plurality of optical fibers having forward free end portions that are co-axially aligned with the nose-piece fiber openings, wherein when the nose-piece is in the forward position and the connector shutter is in the first position the forward free end portions of the optical fibers are protected behind the connector shutter, and wherein when the nose-piece is in the rearward position and the connector shutter is in the second position, the optical fibers extend forwardly past the connector shutter, through the nose-piece fiber openings of the front section of the nose-piece and forwardly beyond the front section of the nose-piece.

2. The fiber optic connector of claim 1, wherein the connector shutter defines at least one opening that aligns with the nose-piece fiber openings when the connector shutter is in the second position, wherein the at least one opening is configured for receiving the optical fibers to allow the optical fibers to extend through the connector shutter.

3. The fiber optic connector of claim 1, wherein the nose-piece fiber openings defined by the front section of the nose-piece are aligned in a row.

4. The fiber optic connector of claim 1, wherein the connector shutter moves along a shutter movement axis between the first and second positions.

5. The fiber optic connector of claim 4, wherein the shutter movement axis is oriented transversely with respect to the front-to-back orientation.

6. The fiber optic connector of claim 4, wherein the connector shutter includes a first end and an opposite second end, wherein the shutter movement axis extends in a direction from the first end to the second end of the connector shutter, wherein the shutter spring engages the connector shutter at the first end, and wherein the connector shutter defines an actuation surface at the second end of the connector shutter.

7. The fiber optic connector of claim 6, wherein the front section of the nose-piece defines a front access notch in alignment with the actuation surface of the connector shutter for allowing a shutter actuation structure to pass through the front section in the front-to-back orientation to engage the actuation surface of the connector shutter to cause movement of the connector shutter from the first position to the second position.

8. The fiber optic connector of claim 7, wherein the fiber optic connector is adapted to be received within a port of a fiber optic adapter, wherein the first optic adapter includes a bare fiber alignment structure for aligning bare fibers of two fiber optic connectors inserted within opposite ports of the fiber optic adapter, wherein the bare fiber alignment structure include fiber-receiving grooves, wherein when the fiber optic connector is inserted in the port the forward free end portions of the optical fibers are received within the fiber-receiving grooves, and wherein the shutter actuation structure is provided in the port and engages the actuation surface of the connector shutter as the fiber optic connector is inserted into the port.

9. The fiber optic connector of claim 8, wherein the fiber optic adapter includes an adapter shutter linearly moveable relative to the bare fiber alignment structure between a blocking position and a non-blocking position, and wherein the fiber optic connector moves the adapter shutter from the blocking position to the non-blocking position as the fiber optic connector is inserted into the port of the fiber optic adapter.

10. The fiber optic connector of claim 1, wherein the connector shutter spring has a cantilevered configuration with a base end unitarily formed with the nose-piece and a free end that engages the connector shutter.

11. The fiber optic connector of claim 10, wherein the connector shutter spring defines a central portion of a major side of the nose-piece.

12. The fiber optic connector of claim 1, further comprising a fiber anchoring unit to which the optical fibers are adhesively bonded, the fiber anchoring unit being mounted within the connector plug body.

13. The fiber optic connector of claim 12, wherein the front section of the nose-piece includes opposite first and second walls that extend rearwardly from the front section and are located between the fiber anchoring unit and the connector plug body.

14. The fiber optic connector of claim 13, wherein the first and second walls slide relative to the fiber anchoring unit and the connector plug body when the nose-piece moves between the forward and rearward positions.

15. The fiber optic connector of claim 12, wherein the forward free end portions of the optical fibers project forwardly beyond a front end of the fiber anchoring unit.

16. The fiber optic connector of claim 12, wherein the fiber anchoring unit provides pitch conversion of the optical fibers from a first pitch in which the optical fibers have a first center-to-center spacing to a second pitch in which the optical fibers have a second center-to-center spacing that is different from the first center-to-center spacing.

17. The fiber optic connector of claim 16, wherein the fiber anchoring unit has a front end and a back end, wherein the optical fibers extend through the fiber anchoring unit in the front-to-back orientation, wherein the forward free end portions of the optical fibers extend forwardly from the front end of the fiber anchoring unit, wherein the first center-to-center spacing is less than the second center-to-center spacing, and wherein the optical fibers have the first center-to-center spacing at the back end of the fiber anchoring unit and have the second center-to-center spacing at the front end of the fiber anchoring unit.

18. The fiber optic connector of claim 17, wherein the first center-to-center spacing is 200 microns and the second center-to center spacing is 250 microns.

19. The fiber optic connector of claim 17, wherein the optical fibers include a front fiber section, a rear fiber section, and an intermediate fiber section positioned between the front fiber section and the rear fiber section, wherein the optical fibers have a bare optical fiber configuration at the front fiber section, wherein the front fiber section includes the forward free end portions of the optical fibers, wherein the optical fibers have a coated, de-ribbonized configuration at the intermediate fiber section, and wherein the optical fibers include a coated, ribbonized configuration at the rear fiber section.

20. The fiber optic connector of claim 19, wherein the fiber anchoring unit includes a first section adjacent the back end of the fiber anchoring unit, a second section in front of the first section, a third section in front of the second section and a fourth section positioned in front of the third section, the fourth section being adjacent to the front end of the fiber anchoring unit, the first section and second section not having fiber grooves, the third and fourth sections defining fiber grooves that extend from the second section to the front end of the fiber anchoring unit, the optical fibers diverging from one another at the second section as the optical fibers extend toward the third section, the fiber grooves being parallel to one another and defining the second center-to-center spacing at the third and fourth sections, the fiber grooves having a first depth at the third section and a second depth at the fourth section, the second depth being shallower than the first depth.

21. The fiber optic connector of claim 20, wherein the first section of the fiber anchoring unit includes a rectangular ribbon receptacle.

22. The fiber optic connector of claim 21, wherein the fiber grooves are V-grooves.

23. The fiber optic connector of claim 21, wherein the rear fiber section of the optical fibers is positioned at the first section of the fiber anchoring unit, wherein the optical fibers extend through the second section and within the fiber grooves through the third and fourth sections of the fiber anchoring unit, wherein the front fiber section of the optical fibers is positioned at the fourth section of the fiber anchoring unit, and wherein the intermediate fiber section is positioned at the second and third sections of the fiber anchoring unit.

24. The fiber optic connector of claim 1, wherein the nose-piece includes a rear section positioned rearward of the receptacle through which the nose-piece fiber openings extend, and wherein the fiber optic connector further comprises a fiber anchoring unit to which the optical fibers are anchored, the fiber anchoring unit being mounted within the connector plug body, the fiber anchoring unit including anchor fiber openings in which the optical fibers are secured, the anchor fiber openings extending through the fiber anchoring unit along the front-to-back orientation and being co-axially aligned with the nose-piece fiber openings and being positioned rearward with respect to the nose-piece fiber openings, the anchor fiber openings having tapered front sections adjacent the nose-piece fiber openings that expand as the tapered front sections extend forwardly toward the nose-piece fiber openings, the nose-piece fiber openings having tapered rear sections rearward of the receptacle and adjacent to the tapered front sections of the anchor fiber openings, the tapered rear sections of the nose-piece fiber openings expanding as the tapered rear sections extend rearwardly toward the tapered front sections of the anchor fiber openings.

25. The fiber optic connector of claim 24, wherein the nose-piece fiber openings further include tapered sections immediately in front of the receptacle that constrict as the tapered sections extend forwardly from the receptacle.

26. A fiber optic connector comprising:
a connector plug body having a front end;
a nose-piece mounted at the front end of the connector plug body, the nose-piece defining a plurality of nose-piece fiber openings, the nose-piece fiber openings extending through the nose-piece in a front-to-back orientation, the nose-piece being moveable relative to the connector plug body along the front-to-back orientation between a forward position and a rearward position, the nose-piece defining a receptacle including connector shutter guide surfaces, and the nose-piece fiber openings including front portions positioned in front of the receptacle and rear portions positioned behind the receptacle;
a nose-piece spring for biasing the nose-piece toward the forward position;
a connector shutter that mounts in the receptacle of the nose-piece, the connector shutter being linearly moveable relative the nose-piece between a first position in which the connector shutter blocks the nose-piece fiber openings and a second position in which the nose-piece fiber openings are not blocked, the connector shutter being guided between the first and second positions by the connector shutter guide surfaces of the nose-piece;
a connector shutter spring that biases the connector shutter toward the first position;
a plurality of optical fibers that extend through the connector plug body, the plurality of optical fibers having forward free end portions that are co-axially aligned with the nose-piece fiber openings, wherein when the nose-piece is in the forward position and the connector shutter is in the first position the forward free end portions of the optical fibers are positioned in the rear portions of the nose-piece fiber openings and are protected behind the connector shutter, and wherein when the nose-piece is in the rearward position and the connector shutter is in the second position, the optical fibers extend forwardly past the connector shutter, through the front portions of the nose-piece fiber openings with the forward free end portions projecting forwardly beyond a front end of the nose-piece;
a fiber anchoring unit to which the optical fibers are anchored, the fiber anchoring unit being mounted within the connector plug body, the fiber anchoring unit including anchor fiber openings in which the optical fibers are secured, the anchor fiber openings extending through the fiber anchoring unit along the front-to-back orientation and being co-axially aligned with the nose-piece fiber openings and being positioned rearward with respect to the nose-piece fiber openings;
the anchor fiber openings having tapered front sections adjacent the rear portions of the nose-piece fiber openings that expand as the tapered front sections extend forwardly toward the rear portions of the nose-piece fiber openings; and
the rear portions of the nose-piece fiber openings having tapered rear sections adjacent the tapered front sections of the anchor fiber openings, the tapered rear sections of the rear portions of the nose-piece fiber openings expanding as the tapered rear sections extend rearwardly toward the tapered front sections of the anchor fiber openings.

27. The fiber optic connector of claim 26, wherein the optical fibers are adhesively bonded to the fiber anchoring unit.

28. The fiber optic connector of claim 26, wherein the front portions of the nose-piece fiber openings have tapered rear sections adjacent the receptacle of the nose-piece, the tapered rear sections of the front portions of the nose-piece fiber openings expanding as the tapered rear sections of the front portions of the nose-piece extend rearwardly toward the receptacle.

29. A fiber optic connector comprising:
a connector plug body having a front end;
a nose-piece mounted at the front end of the connector plug body, the nose-piece defining a plurality of nose-piece fiber openings, the nose-piece fiber openings extending through the nose-piece in a front-to-back orientation, the nose-piece being moveable relative to the connector plug body along the front-to-back orientation between a forward position and a rearward position;
a nose-piece spring for biasing the nose-piece toward the forward position;
a plurality of optical fibers that extend through the connector plug body, the plurality of optical fibers having forward free end portions that are co-axially aligned with the nose-piece fiber openings, wherein when the nose-piece is in the forward position the forward free end portions of the optical fibers are positioned in the nose-piece fiber openings recessed with respect to a front end of the nose-piece, and wherein when the nose-piece is in the rearward position the forward free end portions project forwardly beyond the front end of the nose-piece;

a fiber anchoring unit to which the optical fibers are anchored, the fiber anchoring unit being mounted within the connector plug body, the fiber anchoring unit including anchor fiber openings in which the optical fibers are secured, the anchor fiber openings extending through the fiber anchoring unit along the front-to-back orientation and being co-axially aligned with the nose-piece fiber openings and being positioned rearward with respect to the nose-piece fiber openings;

the anchor fiber openings having tapered front sections adjacent the nose-piece fiber openings that expand as the tapered front sections extend forwardly toward the nose-piece fiber openings; and the nose-piece fiber openings having tapered rear sections adjacent the tapered front sections of the anchor fiber openings, the tapered rear sections of the nose-piece fiber openings expanding as the tapered rear sections extend rearwardly toward the tapered front sections of the anchor fiber openings.

* * * * *